(12) United States Patent
Mainali et al.

(10) Patent No.: US 10,831,720 B2
(45) Date of Patent: Nov. 10, 2020

(54) CLOUD STORAGE DISTRIBUTED FILE SYSTEM

(71) Applicant: Microsoft Technology Licensing, LLC, Redmond, WA (US)

(72) Inventors: Shane Kumar Mainali, Duvall, WA (US); Thomas Leo Marquardt, Newcastle, WA (US); Zichen Sun, Sammamish, WA (US); Georgi Chalakov, Duvall, WA (US); Maneesh Sah, Sammamish, WA (US); Esfandiar Manii, Kirkland, WA (US); Saurabh Pant, Bellevue, WA (US); Dana Yulian Kaban, Seattle, WA (US); Saher B. Ahwal, Redmond, WA (US); Jun Chen, Redmond, WA (US); Da Zhou, Redmond, WA (US); Amit Pratap Singh, Redmond, WA (US); Junhua Gu, Redmond, WA (US); Shaoyu Zhang, Shanghai (CN); Wei Chen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

(21) Appl. No.: 16/019,311

(22) Filed: Jun. 26, 2018

(65) Prior Publication Data
US 2019/0370360 A1     Dec. 5, 2019

Related U.S. Application Data

(60) Provisional application No. 62/678,898, filed on May 31, 2018.

(51) Int. Cl.
*G06F 17/30* (2006.01)
*G06F 16/185* (2019.01)
(Continued)

(52) U.S. Cl.
CPC .......... *G06F 16/185* (2019.01); *G06F 9/5077* (2013.01); *G06F 16/122* (2019.01);
(Continued)

(58) Field of Classification Search
CPC .... G06F 16/185; G06F 16/182; G06F 16/188; G06F 16/122; G06F 9/5077; H04L 67/1097
See application file for complete search history.

(56) References Cited

U.S. PATENT DOCUMENTS 7,743,023 B2 * 6/2010 Teodosiu .............. G06F 16/184
                                                    707/612
8,332,378 B2 * 12/2012 Clayton ................. G06Q 30/04
                                                    707/706
(Continued)

OTHER PUBLICATIONS

Escriva, et al., "The Design and Implementation of the Warp Transactional Filesystem", In 13th {USENIX} Symposium on Networked Systems Design and Implementation ({NSDI}, Mar. 16, 2016, pp. 469-483.
(Continued)

*Primary Examiner* — Huawen A Peng
(74) *Attorney, Agent, or Firm* — Schwegman Lundberg & Woessner, P.A.

(57) ABSTRACT

Methods, systems, and computer programs are presented for providing file system functions on a cloud storage system based on blob storage. A cloud storage system comprises storage clusters, and each storage cluster comprises a plurality of storage nodes (each including a partition layer that stores data in blobs organized within containers, and a stream layer for streaming blob data), a hierarchical namespace service for implementing file system functions on the data stored in the blobs and, a front end layer for processing user requests to access and manage data stored on the blobs. The file system functions include flat
(Continued)

namespace functions and hierarchical namespace functions. Further, the front end layer accesses the partition layer to access the blobs based on addresses of blobs and accesses the hierarchical namespace service to identify the blobs.

19 Claims, 27 Drawing Sheets

(51) Int. Cl.
    *H04L 29/08*     (2006.01)
    *G06F 9/50*     (2006.01)
    *G06F 16/11*     (2019.01)
    *G06F 16/182*     (2019.01)
    *G06F 16/188*     (2019.01)

(52) U.S. Cl.
    CPC .......... *G06F 16/182* (2019.01); *G06F 16/188* (2019.01); *H04L 67/1097* (2013.01)

(56) References Cited

U.S. PATENT DOCUMENTS

| | | | |
|---|---|---|---|
| 2010/0106695 | A1 | 4/2010 | Calder et al. |
| 2011/0137966 | A1 | 6/2011 | Srinivasan et al. |
| 2011/0197088 | A1 | 8/2011 | Kumar et al. |
| 2012/0030179 | A1* | 2/2012 | Kauffman ............... G06F 16/13 707/654 |
| 2013/0185258 | A1 | 7/2013 | Bestler et al. |
| 2014/0025711 | A1 | 1/2014 | Avati et al. |
| 2015/0378833 | A1* | 12/2015 | Misra ................. G06F 11/1469 714/19 |
| 2016/0179915 | A1 | 6/2016 | Grebnov et al. |
| 2016/0224433 | A1* | 8/2016 | Testardi ................ G06F 16/185 |
| 2017/0315882 | A1 | 11/2017 | Yammine et al. |
| 2019/0370362 | A1 | 12/2019 | Mainali et al. |
| 2019/0370365 | A1 | 12/2019 | Chalakov et al. |

OTHER PUBLICATIONS

Matri, et al., "Týr: Blob Storage Meets Built-In Transactions", In Proceedings of the International Conference for High Performance Computing, Networking, Storage and Analysis, Nov. 13, 2016, 12 Pages.
"International search Report and Written Opinion Issued in PCT Application No. PCT/US19/032547", dated Aug. 7, 2019, 14 Pages.
"International Search Report and Written Opinion Issued in PCT Application No. PCT/US19/032548", dated Aug. 7, 2019, 14 Pages.
Ramakrishnan, et al., "Azure Data Lake Store : A Hyperscale Distributed File Service for Big Data Analytics", In Proceedings of the ACM International Conference on Management of Data, May 9, 2017, pp. 51-63.
U.S. Appl. No. 16/018,553, filed Jun. 26, 2018, Distributed Transactions In Cloud Storage With Hierarchical Namespace.
U.S. Appl. No. 16/018,650, filed Jun. 26, 2018, Multi-Protocol Cloud Storage for Big Data and Analytics.
"International Search Report and Written Opinion Issued in PCT Patent Application No. PCT/US19/032546", dated Aug. 19, 2019, 12 Pages.
"Cloud Data Access", Retrieved from: https://docs.hortonworks.com/HDPDocuments/HDP2/HDP-2.6.1/bk_cloud-data-access/content/wasb-atomic-rename.html., Jun. 1, 2017, 78 Pages.
"Hadoop Azure Support: Azure Blob Storage", Retrieved from: https://hadoop.apache.org/docs/current/hadoop-azure/index.html, Retrieved on Mar. 30, 2018, 9 Pages.
"Hadoop filesystem", Retrieved from: https://hadoop.apache.org/docs/current/hadoop-project-dist/hadoop-common/filesystem/introduction.html, Retrieved on Mar. 30, 2018, 8 Pages.
"HDFS Permissions Guide", Retrieved from: https://hadoop.apache.org/docs/current/hadoop-project-dist/hadoop-hdfs/HdfsPermissionsGuide.html, Retrieved on Mar. 30, 2018, 6 Pages.
"Microsoft Azure Storage Team Blog", Retrieved from: https://blogs.msdn.microsoft.com/windowsazurestorage/, Retrieved on Mar. 30, 2018, 5 Pages.
"Swagger Editor", Retrieved from: http://editor.swagger.io/#, Retrieved on Jun. 28, 2018, 3 Pages.
"Testing the Filesystem Contract", Retrieved from: http://hadoop.apache.org/docs/current/hadoop-project-dist/hadoop-common/filesystem/testing.html, Retrieved on Mar. 30, 2018, 6 Pages.
"The Hadoop FileSystem API Definition", Retrieved from: http://hadoop.apache.org/docs/current/hadoop-project-dist/hadoop-common/filesystem/index.html, Retrieved on Mar. 30, 2018, 1 Page.
"WebHDFS Rest API", Retrieved from: http://hadoop.apache.org/docs/current/hadoop-project-dist/hadoop-hdfs/WebHDFS.html, Retrieved on Mar. 30, 2018, 53 Pages.
Calder, et al., "Windows Azure Storage: A Highly Available Cloud Storage Service with Strong Consistency", In Proceedings of the 23rd ACM Symposium on Operating Systems Principles, Oct. 23, 2011, pp. 143-157.
Dolin, et al., "MicrosoftUapi-guidelines", Retrieved from: https://github.com/Microsoft/api-guidelines, Retrieved on Mar. 30, 2018, 1 Page.
Myers, et al., "Introduction to Azure Storage", Retrieved from: https://docs.microsoft.com/en-us/azure/storage/storage-introduction, Apr. 5, 2018, 12 Pages.
Ron, et al., "OpenAPI Specification", Retrieved from: https://github.com/OAI/OpenAPI-Specification/blob/master/versions/2.0.md, Retrieved on Mar. 30, 2018, 38 Pages.
Roth, et al., "Azure subscription and service limits, quotas, and constraints", Retrieved from: https://docs.microsoft.com/en-us/azure/azure-subscription-service-limits#storage-limits, Mar. 29, 2018, 61 Pages.
"Non Final Office Action Issued in U.S. Appl. No. 16/018,553", dated Mar. 3, 2020, 15 Pages.
"Non Final Office Action Issued in U.S. Appl. No. 16/018,650", dated Apr. 24, 2020, 22 Pages.
Steynberg, Minette, "Different Azure Storage types (File, Blob, Queue and Table)", Retrieved from: https://www.sqlshack.com/different-azure-storage-types-file-blob-queue-table/, May 3, 2017, 10 Pages.

\* cited by examiner

MASTER DIRECTORY BLOCK TABLE 1100

| | DBID 1102 | NAME 1104 | CT 1106 | DEL | FILE | EBID 1108 |
|---|---|---|---|---|---|---|
| 1 | GUID-ROOT | . | 00001 | N | Y | GUID-FILE1 |
| 2 | GUID-ROOT | path1 | 00100 | N | N | GUID-PATH1 |
| 3 | GUID-ROOT | path2 | 00200 | N | N | GUID-PATH2 |
| 4 | GUID-PATH1 | . | 00100 | N | Y | GUID-FILE2 |
| 5 | GUID-PATH2 | . | 00200 | N | N | GUID-FILE3 |
| 6 | GUID-PATH2 | file1 | 00300 | N | Y | GUID-FILE4 |
| 7 | GUID-PATH2 | file1 | 00350 | N | Y | GUID-FILE4 |
| 8 | GUID-PATH2 | file1 | 00400 | N | Y | GUID-FILE4 |
| 9 | GUID-PATH2 | path3 | 00400 | N | N | GUID-PATH3 |
| 10 | GUID-PATH3 | . | 00400 | N | Y | GUID-FILE14 |
| 11 | GUID-PATH3 | file3 | 00401 | N | N | GUID-FILE15 |

Rows grouped as: 1110A (rows 1), 1110B (rows 2, with row 3?), 1110C, 1110D

FIG. 11

FILE SYSTEM OPERATIONS

2200

| FUNCTION | METHOD AND URI |
|---|---|
| CREATE FILESYSTEM | PUT /{filesystem}?resource=filesystem&api-version={version} |
| DELETE FILESYSTEM | DELETE /{filesystem}?resource=filesystem&api-version={version} |
| GET PROPERTIES | HEAD /{filesystem}?resource=filesystem&api-version={version} |
| SET PROPERTIES | PATCH /{filesystem}?resource=filesystem&component=properties&api-version={version} |
| LIST PATHS | GET /{filesystem}?resource=filesystem&recursive={true\|false}&prefix={path}&segmentId={id}&api-version={version} |

FIG. 22

FILE AND DIRECTORY OPERATIONS

| FUNCTION | METHOD AND URI |
|---|---|
| CREATE | PUT /{filesystem}/{path}?resource={file\|directory}&api-version={version} |
| DELETE | DELETE /{filesystem}?resource={file\|directory}&recursive={true\|false}&leaseId={id}&api-version={version} |
| RENAME | PUT /{filesystem}/{path}?resource={file\|directory}&leaseId={id}&api-version={version} Required Request Headers: x-ms-rename-source: {sourcePath} |
| APPEND | PATCH /{filesystem}/{path}?resource=file&component=data&position={fileOffset}&leaseId={id}&api-version={version} |
| FLUSH | PATCH /{filesystem}/{path}?resource=file&position={fileOffset}&leaseId={id}&api-version={version} |
| READ | GET /{filesystem}/{path}&api-version={version} |
| ACQUIRE/ RENEW/ RELEASE LEASE | POST /{filesystem}/{path}?action=acquire&duration={seconds}&api-version={version}<br>POST /{filesystem}/{path}?action=renew&id={leaseId}&api-version={version}<br>POST /{filesystem}/{path}?action=release&id={leaseId}&api-version={version} |

BLOB SS
SAMPLE COMMANDS

⎯ 2402

Create Account janeaccount

Create Container janeaccount;mycontainer

PUT http://janeaccount.blog.core.windows.net/mycontainer/files/myblob.txt

Partition Key = janeaccount;mycontainer;files/myblob.txt

Put Block (10MB, B1) http://janeaccount.blog.core.windows.net/mycontainer/files/myblob.txt Put Block (10MB, B2) http://janeaccount.blog.core.windows.net/mycontainer/files/myblob.txt Put Block List (B1, B2) http://janeaccount.blog.core.windows.net/mycontainer/files/myblob.txt Get Blob (2MB-4MB) http://janeaccount.blog.core.windows.net/mycontainer/files/myblob.txt List Blobs delimeter "/", prefix "files/"

FIG. 24

BLOB FS SAMPLE COMMANDS ⎯ 2502

Create Account janeaccount

Create File System janeaccount;myfs

Create Directory janeaccount;myfs;files

Create File http://janeaccount.dfs.core.windows.net/myfs/files/myblob.txt

Append File (10MB) http://janeaccount.dfs.core.windows.net/myfs/files/myblob.txt Append File (10MB) http://janeaccount.dfs.core.windows.net/myfs/files/myblob.txt Flush File (20MB) http://janeaccount.dfs.core.windows.net/myfs/files/myblob.txt Read File http://janeaccount.dfs.core.windows.net/myfs/files/myblob.txt List Paths http://janeaccount.dfs.core.windows.net/myfs/files

FIG. 25

CLOUD STORAGE DISTRIBUTED FILE SYSTEM

CLAIM OF PRIORITY

This application claims priority from U.S. Provisional Patent Application No. 62/678,898, filed May 31, 2018, and entitled "Distributed Storage File System." This provisional application is herein incorporated by reference in its entirety.

TECHNICAL FIELD

The subject matter disclosed herein generally relates to methods, systems, and programs for performing distributed transactions in a cloud storage system.

BACKGROUND

Cloud storage is a model of data storage in which digital data is stored in logical pools of storage embodied in physical storage devices hosted by a cloud storage provider. A cloud storage system may include a networked set of computing resources, including storage devices, servers, routers, etc., that are configurable, shareable, provide data security, and provide access to cloud storage to user devices over the Internet. A cloud storage system provides users the ability to store very large amounts of data for essentially any duration of time. Cloud storage system customers have access to their data from anywhere, at any time, and pay for what they use and store. Data stored in cloud storage may be durably stored using both local and geographic replication to facilitate disaster recovery.

Some storage systems provide a flat storage structure where simple objects are stored in containers. These objects are sometime referred to as blobs (originally derived from Binary Large OBject) which refer to a block of data stored in a database, and a blob may include an image, a frame of a video, a video, a readable document, etc. To access these objects, the user provides an account, the name of the container, and the blob identifier. However, this simple structure may not be useful for some users that wish to organize their objects based on their applications.

Users may create their own organizational schemes, such as by organizing the blobs by their name, and then performing filtering based on the names. However, this scheme is often insufficient for file-system workloads, and simple operations, such as renaming objects may require thousands, or millions or even more, to rename operations.

Traditional Big-Data and Analytics applications have forced customers to create many data silos for different use cases and protocol usages over their data, which requires not only managing lots of data silos, but copying data between them and managing all of those copies, which greatly increases cost and complexity for customer implementations.

BRIEF DESCRIPTION OF THE DRAWINGS

Various ones of the appended drawings merely illustrate example embodiments of the present disclosure and cannot be considered as limiting its scope.

FIG. 11 shows an example master directory block table, according to some example embodiments.

FIG. 22 shows the file system operations for the blob FS (file system) API, according to some example embodiments.

FIG. 23 shows file and directory operations for the blob FS API, according to some example embodiments.

FIG. 24 shows sample blob-storage commands, according to some example embodiments.

FIG. 25 shows sample blob FS commands, according to some example embodiments.

DETAILED DESCRIPTION

Figure 1:
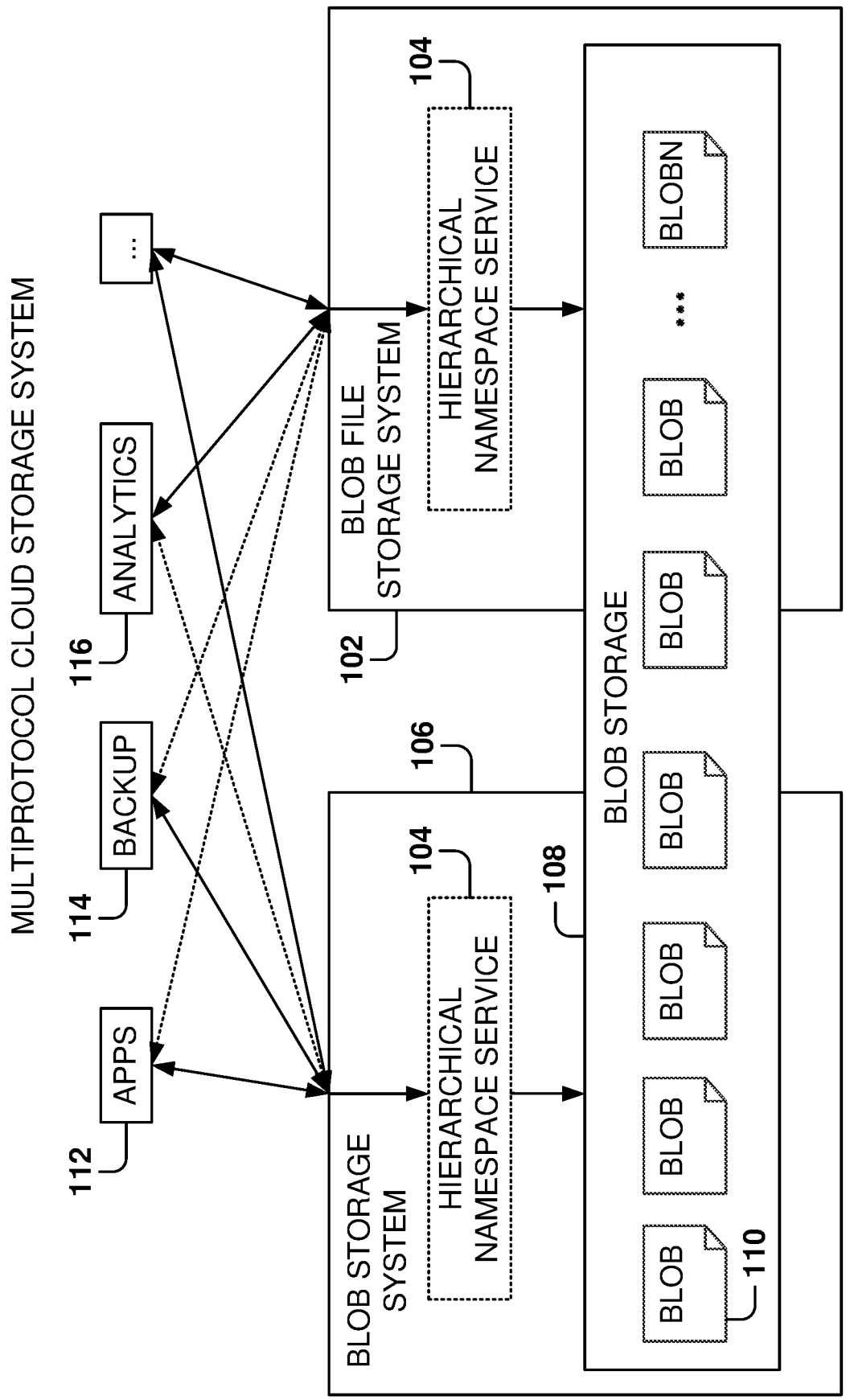
FIG. 1 is a diagram of an architecture for a multiprotocol cloud storage system, according to some example embodiments.

Example methods, systems, and computer programs are directed to executing distributed transactions in a cloud storage system with a hierarchical namespace. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Some cloud storage systems store file system objects in a flat global namespace. However, many big data and data analytics applications are designed to store data in a hierarchical namespace. For example, many big data and data analytics applications are configured to work with the Apache™ Hadoop® Distributed File System (HDFS). The HDFS design is based on requirements for a POSIX filesystem, but in a few key areas the POSIX semantics has been traded to increase data throughput rates. The POSIX namespace is a hierarchical namespace with unlimited depth of nesting and atomic operations over the namespace.

To enable the use of a hierarchical directory structure in a cloud storage system that uses a flat namespace, embodiments disclosed herein provide a hierarchical namespace service to provide file system operations for a hierarchical structure and for a flat object-storage structure, while using the same underlying object storage layer for both types of services. This enables a multi-modal cloud storage service that may be accessed under different interfaces, but the multiple interfaces access the same underlying data.

Both the flat namespace (FN) and the hierarchical namespace (HN) are useful. FN has cost and perf advantages in some scenarios, whereas HN has capability, semantic, and different performance advantages. Offering both FN and HN provides customers with the flexibility to choose the best solution for their workloads and applications.

Embodiments presented herein implement the hierarchical namespace feature of a cloud storage system, which is referred to herein as "blob FS." The blob FS coexists with a blob storage system, referred to herein as "blob SS." Both blob SS and blob FS access the same underlying blob objects. The hierarchical namespace adds both single-node partition transaction and multi-node partition distributed transaction support, and the distributed transactions are completely flexible to combine any kind of namespace operations together.

Unlike some types of cloud storage (e.g., blob storage), hierarchical namespaces traditionally do not horizontally scale, e.g., they only scale up to a certain limit. This traditionally is caused by having to keep namespace data structures in-memory and not being able to scale out the computational and transaction aspects of the namespace. Typical file systems are evidence of this.

Blob FS is designed to horizontally scale for file system solutions, just like users are used to with the blob storage system. Single-node partition transactions are used for basic operations. To enable a single storage account or even a single directory in a storage account, to horizontally scale, operations (e.g., "rename directory," "delete directory," etc.) are enabled to operate across nodes and partitions in a distributed fashion. Strongly consistent distributed transactions are used to support these types of file system operations while providing true horizontal scalability.

Embodiments provide both blob SS and blob FS interfaces over the same data set, eliminating the need for copying data and creating data silos. Given that file system and object storage are two of the common interfaces for Big Data and Analytics over cloud storage, simultaneous support of both interfaces enables a majority of scenarios to take advantage of this flexibility.

In one embodiment, a method is provided. The method includes receiving, from a user device, a request comprising operations to be executed by a cloud storage system, the request being for atomic execution of the operations. The method further includes identifying nodes for executing the operations. Each node has a respective clock, controls a state of execution for at least one operation, and has at least part of a memory table for controlling updates to entities in the cloud storage system (an entity being one of a file or a directory). The method further includes processing, by each of the nodes, the respective operations. Processing one operation further includes: if the node is a first node in the processing, setting a commit timestamp (CS) to a value of the clock in the node; if the node is not the first node and the value of the clock in the node is less than a current value of the CS, waiting for the value of the clock in the node to reach the current value of the CS; and updating the current value of the CS based on the value of the clock in the node. The method further includes updating the memory table based on the current value of the CS, committing the atomic execution of the request in the cloud storage system utilizing a final value of the CS, and returning a status of the request to the user device.

In another embodiment, a system includes a memory comprising instructions and one or more computer processors. The instructions, when executed by the one or more computer processors, cause the one or more computer processors to perform actions comprising: receiving, from a user device, a request comprising operations to be executed by a cloud storage system, the request being for atomic execution of the operations; identifying nodes for executing the operations, each node having a respective clock, each node controlling a state of execution for at least one operation, and each node having at least part of a memory table for controlling updates to entities in the cloud storage system, an entity being one of a file or a directory; processing, by each of the nodes, the respective operations, where processing one operation further comprises: if the node is a first node in the processing, setting a commit timestamp (CS) to a value of the clock in the node; if the node is not a first node and the value of the clock in the node is less than a current value of the CS, waiting for the value of the clock in the node to reach the current value of the CS; and updating the current value of the CS based on the value of the clock in the node; updating the memory table based on the current value of the CS; and committing the atomic execution of the request in the cloud storage system utilizing a final value of the CS; and returning a status of the request to the user device.

In yet another embodiment, a machine-readable storage medium (e.g., a non-transitory storage medium) includes instructions that, when executed by a machine, cause the machine to perform operations comprising: receiving, from a user device, a request comprising operations to be executed by a cloud storage system, the request being for atomic execution of the operations; identifying nodes for executing the operations, each node having a respective clock, each node controlling a state of execution for at least one operation, and each node having at least part of a memory table for controlling updates to entities in the cloud storage system, an entity being one of a file or a directory; processing, by each of the nodes, the respective operations, where processing one operation further comprises: if the node is a first node in the processing, setting a commit timestamp (CS) to a value of the clock in the node; if the node is not a first node and the value of the clock in the node is less than a current value of the CS, waiting for the value of the clock in the node to reach the current value of the CS; and updating the current value of the CS based on the value of the clock in the node; updating the memory table based on the current value of the CS; and committing the atomic execution of the request in the cloud storage system utilizing a final value of the CS; and returning a status of the request to the user device.

In another embodiment, a method is provided. The method includes providing a first application programming interface (API) by a cloud storage system that stores data in blobs organized within containers. Further, the method includes providing, by the cloud storage system, a second API, the first API and the second API providing operations for a flat namespace and a hierarchical namespace for accessing data, the flat namespace being for accessing data based on account, container, and blob identifier, the hierarchical namespace being for accessing data based on account, directory, and file, wherein a directory is configured to include files and other directories. The first API utilizes the flat namespace by default and the second API utilizes the hierarchical namespace by default. The method further includes receiving a command from a user device. When the command is received for the flat namespace, the command is performed utilizing containers and blob identifiers included in the command. When the command is received via the hierarchical namespace, the hierarchical namespace service is accessed to translate directories and files included in the command to one or more blob identifiers, and the command is performed utilizing the one or more blob identifiers resulting from the translation. Furthermore, after executing the command, a response is sent to the user device.

In another embodiment, a cloud storage system comprises storage clusters. Each storage cluster comprises a plurality of storage nodes, a hierarchical namespace service for implementing file system functions on the data stored in the blobs, and a front end layer for processing user requests to access and manage data stored on the blobs. Each storage nodes includes a partition layer that stores data in blobs that are organized within containers, and a stream layer for streaming blob data. The file system functions include directory functions and file functions, each directory being configured to include files and other directories as requested via the file system functions, each file being stored on one blob. The front end layer accesses the partition layer to access the blobs based on addresses of blobs, and the front end layer accesses the hierarchical namespace service to identify the blobs.

FIG. 1 is a diagram of an architecture for a multiprotocol cloud storage system, according to some example embodiments. In some example embodiments, the storage system includes a blob storage system ("blob SS") 106 and a blob file storage system 102 ("blob FS.") Different end-user applications 112, backup applications 114, analytics appli- cations 116, etc., may access the storage system via either the blob SS 106 or the blob FS 102.

A blob storage layer 108 is accessed by both storage systems, and the blob storage layer 108 includes a plurality of blobs 110. The blob SS 106 and the blob FS perform a direct access to the blob storage layer 108 or they may access the blobs utilizing the hierarchical namespace service 104.

The hierarchical namespace service 104 is for mapping file system object paths in the hierarchical namespace to file system object identifiers in the flat namespace, in accordance with example embodiments. The hierarchical namespace service 104 is configured to map commands for the hierarchical file system to flat file system commands for accessing the blobs 110. In other words, a command may define a hierarchical pathname for a file system object, even though the file system object is stored in the flat file system. The hierarchical namespace service 104 is configured to map hierarchical paths for the blob system objects (e.g., files) to blob 110 identifiers corresponding to the blob storage 108.

As used herein, a flat file system is a storage system that storages objects (e.g., blobs) in containers, and accessing an object in the flat file system requires specifying the identifier for the container and the identifier of the blob within the container. In some example embodiments, the hierarchical namespace service 104 maintains a mapping between the hierarchical namespace identifiers (or paths) and the flat namespace identifiers of the file system objects stored in flat namespace storage system 106. In one example embodiment, the mapping is maintained in a namespace table. By maintaining such a mapping, hierarchical namespace service 104 can execute file system commands such as "move file" or "move directory" in flat namespace storage system without having to physically move a file or move a folder (and all of its contents, which could be tens, hundred, thousands, millions, billions, or even greater numbers of files) in storage. Instead, in each case, one or more map entries may be modified, rather than physically moving file system objects, which would entail expensive file system operations to execute. By changing map entries rather than performing expensive file system object operations, embodiments enable a significant reduction in processor operations and load.

Blob FS handles blob objects internally, but blob FS abstracts away the blob and blob type notions from the customer. Additionally, blob FS optimizes the use of blob types, for better performance and lower cost in Big Data and Analytics workloads. The internal format of data blocks and blob metadata is shared between blob SS and blob FS, so they are fully interoperable. Ensuring this compatibility and sharing is one of the challenges and technological advancements of implementations presented herein because support is provided for both interfaces while allowing each interface to be optimized for their own use cases.

In some example embodiments, there are three types of blobs: block blobs, append blobs, and page blobs. The block blobs store text and binary data and are made up of blocks of data that can be managed individually. The append blobs are made of blocks like block blobs, but that are optimized for append operations. Append blobs are ideal for some scenarios, such as logging data. Further, the page blobs store random access files.

Blob FS utilizes the underlying blob SS utilities, such as compression and encryption. Many blob features, such as "soft delete," "change notifications," "change feed," etc., are shared because the same internal blobs are used internally.

Since blob SS and blob FS are interoperable, all of the Big Data and Analytics usage with blob FS can take advantage of the entire ecosystem automatically.

When the user wants to read from the file via blob FS with HN enabled, the hierarchical namespace service 104 is utilized to identify where the data resides (e.g., the blob requested) and then blob FS may access the data directly from the blob.

Figure 2:
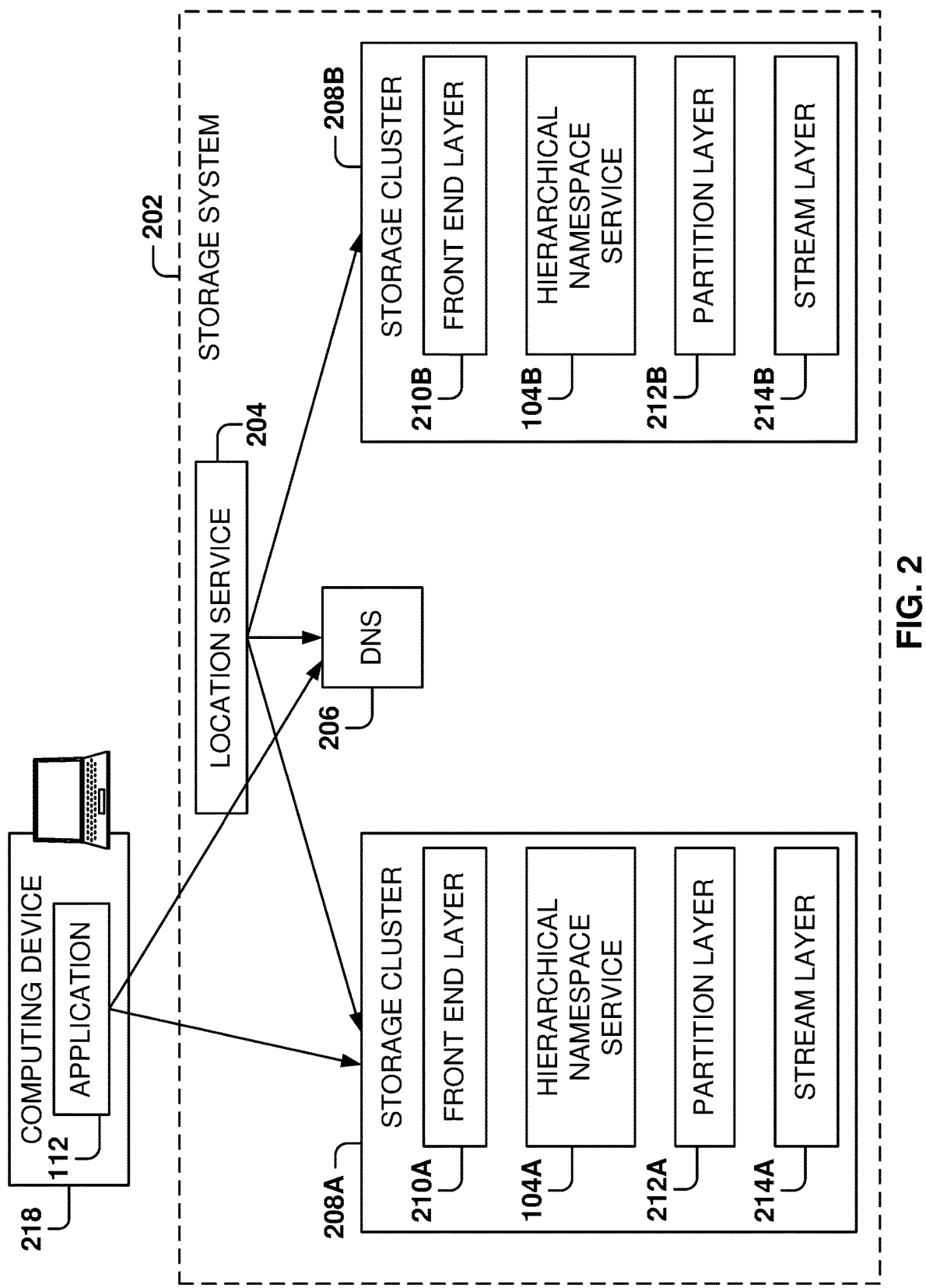
FIG. 2 is a block diagram of a storage system that includes a namespace service for mapping file system commands from a hierarchical namespace to a flat namespace, in accordance with example embodiments.

FIG. 2 is a block diagram of a storage system that includes a namespace service for mapping file system commands from a hierarchical namespace to a flat namespace, in accordance with example embodiments. The storage system 202 stores file system objects for user devices, such as a user device 218, which can number in the tens, hundreds, thousand, millions, and even greater numbers of user devices. In some example embodiments, the storage system 202 includes a location service 204, a domain name system (DNS) 206, a first storage cluster 208A, and a second storage cluster 208B.

The first storage cluster 208A includes a front end layer 210A, a partition layer 212A, the hierarchical namespace service 104A, a partition layer 212A, and a stream layer 214A. The second storage cluster 208B includes a front end layer 210B, the hierarchical namespace service 104B, a partition layer 212B, and a stream layer 214B. The storage system 202 may include any number of storage clusters implemented similarly to first and second storage clusters 208A and 208B, including numbers in the tens, hundreds, thousand, millions, and even greater numbers of storage clusters.

The storage clusters 206A and 206B have racks of physical storage servers, where each rack is built out as a separate fault domain with redundant networking and power. Each of the storage clusters 206A and 206B may include any number or racks, with any number of storage nodes per rack.

The location service 204 may be implemented in one or more servers, and is configured to manage the storage clusters 206A and 206B. The location service 204 is also responsible for managing the account namespace metadata across all storage clusters. The location service 204 allocates accounts to storage clusters 206A and 206B and manages the accounts across storage clusters 206A and 206B for disaster recovery and load balancing.

In some example embodiments, the storage system 202 includes storage in multiple locations in multiple geographic regions (e.g., North America, Europe, Asia, etc.). Each location may include a data center containing multiple storage clusters. To provision additional capacity, the location service 204 may add new regions, new locations to a region, or new storage clusters to a location.

The location service 204 tracks the resources used by each storage cluster, including storage clusters 206A and 206B, across all locations. In some example embodiments, when an application requests a new account for storing data, the application specifies the location affinity for the storage (e.g., US North region). The location service 204 chooses a storage cluster within that location as the primary storage cluster for the account using heuristics based on the load information across all storage clusters (which considers the fullness of the storage clusters and other metrics such as network and transaction utilization). Further, the location service 204 stores the account metadata information in the chosen storage cluster, which tells the storage cluster to start handling traffic for the assigned account. The location service 204 updates the DNS 206 to allow requests to route from a URI to that storage cluster's virtual IP (VIP) address (an IP address the storage cluster exposes for external traffic).

The front End (FE) layers 210A and 210B each includes a set of stateless servers that receive incoming requests from applications in user devices such as the user device 218. Upon receiving a request, the corresponding FE 210 looks up the account name, parses the request, authenticates and authorizes the request, and then routes the request to a partition server in the corresponding partition layer 212 based on a partition key. The partition layer 212 maintains a partition map that keeps track of the partition key ranges, and which partition server is serving which partition key, for the storage cluster. The partition key is also referred to herein as the partition name. The FE servers cache the partition map and uses the partition map to determine which partition server to forward each request to. The FE servers also stream large objects directly from the corresponding stream layer 214, and cache frequently accessed data for efficiency. The hierarchical namespace service 104A and 104B are respectively positioned between front-end layer 210A and partition layer 212A, and front-end layer 210B and partition layer 212B. The hierarchical namespace service 104A and 104B are each an example of hierarchical namespace service 104 of FIG. 1 and are configured to transform requests that utilize hierarchical namespace identifiers to refer to file system objects to requests directed to the file system objects in the flat namespace of storage clusters 208A and 208B.

The partition layers 212A and 212B are each configured for managing and understanding higher level data abstractions (e.g., blob, table, queue), providing transaction ordering and strong consistency for objects, storing object data on top of the corresponding stream layer, and caching object data to reduce disk input/output (I/O).

Furthermore, partition layers 212A and 212B each enable scalability by partitioning the data objects within the corresponding storage cluster 208. As described earlier, data objects have a partition key. The data objects may be broken down into disjointed ranges based on the partition key values and served by different partition servers. The partition layers 212A and 212B each manage which partition server is serving what partition key ranges for the data objects (e.g., blobs, tables, and queues). In addition, the partition layers 212 provide automatic load balancing of partition keys across the partition servers to meet the traffic needs of the data objects.

The stream layers 214 store the data on physical storage (e.g., hard disks, solid state storage, etc.) and is in charge of distributing and replicating the data across many servers to keep data durable within the corresponding storage cluster. The stream layers 214 can each be thought of as a distributed file system layer within a storage cluster. A stream layer handles files, called "streams" (which are ordered lists of large storage chunks called "extents"), how to store them, how to replicate them, etc., but the stream layer does not handle higher level object constructs or their semantics. The data is stored in the stream layers 214 and is accessible from the partition layers 212 and from the front end layer 210. In some cases, the front end layer 210 obtains data pointers from the partition layer 212 and the front end layer 210 reads the data directly from the stream layer 214.

It is to be noted that the data may be stored in any form, including file system objects such as files and folders, blobs 110 (e.g., user files), tables (structured storage), and queues (message delivery). The stream layer 214 accesses data in the form of large files referred to as streams, and enables the corresponding partition layer to open, close, delete, rename, read, append to, concatenate the streams, and many others.

In a traditional Hadoop implementation, there is a limit of low petabytes of data size, or some few hundred million files. Beyond that, the naming service cannot scale anymore because the naming service has to be kept in memory, similar to traditional operating systems and big-data file systems. By implementing a distributed hierarchical namespace service 104, blob SS and blob FS are able to scale horizontally without the memory constraints of a single machine or a few machines.

Figure 3:
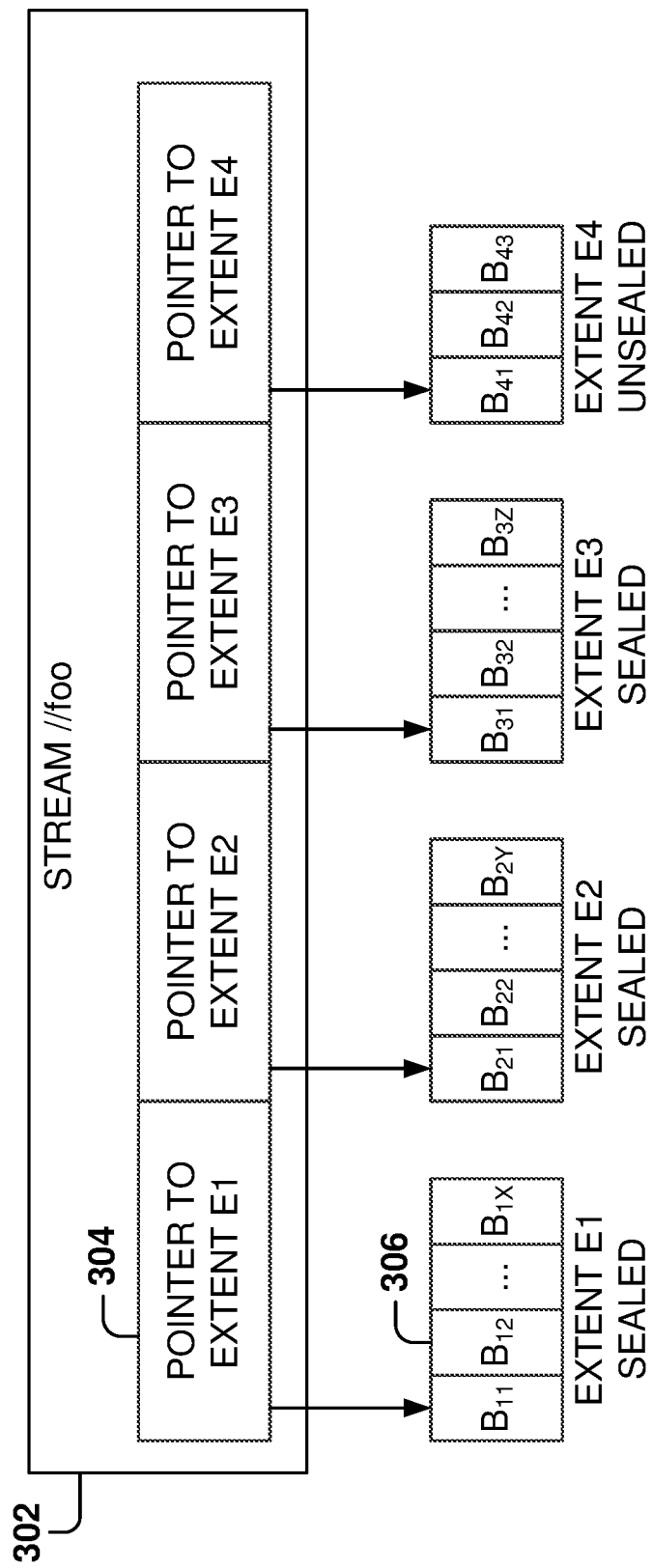
FIG. 3 illustrates a structure for storing streams, according to some example embodiments.

FIG. 3 illustrates the structure for storing streams 302, according to some example embodiments. In some example embodiments, a stream is an ordered list of extent pointers 304, where the extent 304 is a sequence of append blocks 306. For example, a stream "//foo" 302 may contain pointers 304 to several extents (e.g., E1, E2, E3, and E4). Each extent 304 contains a set of blocks 306 that were previously appended. In one example, E1, E2 and E3 may be sealed extents, which means that they can no longer be appended to, and E4 is unsealed, which means that new blocks may be appended to the extent. If an application reads the data of the stream "//foo" from beginning to end, the application receives the block contents of the extents in the order of E1, E2, E3, and E4.

A block is a unit of data for writing and reading. In an embodiment, a block can be up to N bytes (e.g., 4-100 MB). The data is written (e.g., appended) as one or more concatenated blocks to an extent, where blocks do not have to be the same size. An append may be specified in terms of blocks and the size of each block. A read gives an offset to a stream or extent, and the stream layer reads as many blocks as needed at the offset to fulfill the length of the read. When performing a read, the entire contents of a block are read. For instance, the corresponding stream layer may store its checksum validation at the block level, one checksum per block. The whole block is read to perform the checksum validation, and may be checked on every block read. All blocks may be validated against their checksums periodically to check for data integrity issues.

An extent is the unit of replication in the stream layer, and one example default replication policy is to maintain three replicas within a storage cluster for an extent. The target extent size used by the partition layer may be 1 GB, for example, but other values are also possible. To store small objects, the partition layer appends many of them to the same extent and potentially even in the same block. To store large objects (e.g., terabyte-sized objects, which may include several blobs), the objects may be broken up over many extents by the partition layer. The partition layer keeps track of what streams, extents, and byte offsets in the extents in which objects are stored as part of its index.

Every stream has a name in the stream layer, and the stream appears as a large file to the partition layer. Streams may be appended to, and can be randomly read from. When the extents are concatenated together, the extents represent the full contiguous address space in which the stream can be read in the order the extents were added to the stream. A new stream can be constructed by concatenating extents from existing streams, which can be a fast operation because a list of pointers is updated. Only the last extent in the stream can be appended to, and all the prior extents in the stream are immutable.

Figure 4:
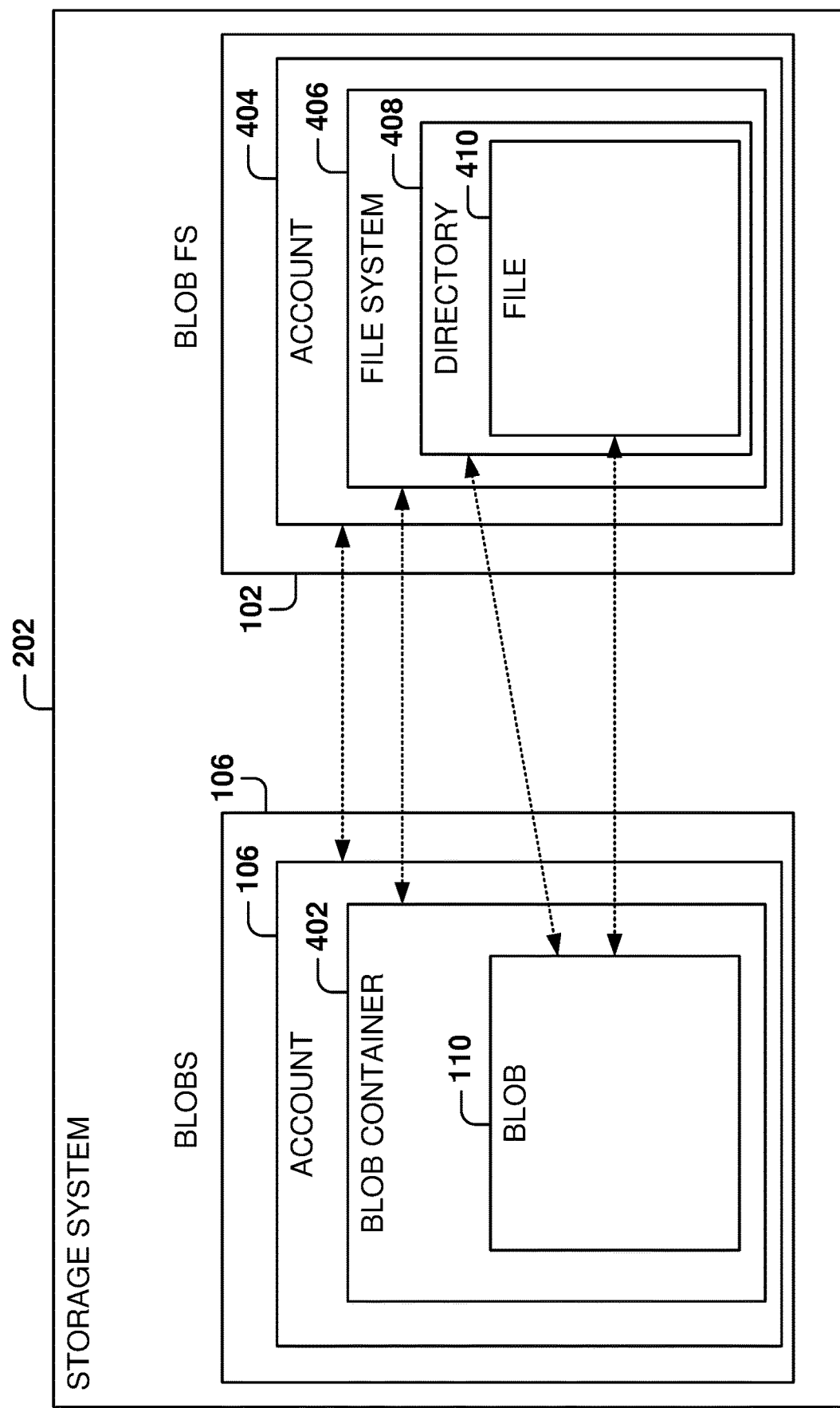
FIG. 4 illustrates the different hierarchies for a flat storage system and a hierarchical storage system, according to some example embodiments.

FIG. 4 illustrates the different object hierarchies for a flat storage system and a hierarchical storage system, according to some example embodiments. The storage system 202 provides a global namespace that allows clients to address their storage needs and scale to arbitrary amounts of storage needed over time.

In some example embodiments, the storage system 202 includes two different types of hierarchies: a blobs hierarchy 106 and a blob FS hierarchy 102. Both hierarchies can coexist within the storage system 202 and allow users to access storage in two different ways: with the flat namespace or the hierarchical namespace. The objects in blob storage may be accessed from anywhere via HTTP or HTTPS and they may be addressed as blobs or as files.

The blob SS hierarchy 106 includes accounts 106, the accounts 106 include blob containers 402, and the blob containers 402 include blobs 110. The blob FS hierarchy 102 includes accounts 404, the accounts 404 include file system 406, the filesystems 406 include directories 408, and the directories 408 include files 410.

The files 410 and directories 408 are interoperable with blobs 110. In some example embodiments, a directory 408 uses an empty blob as a place holder when using FN as HN has first-class directory entries in the directory block storage. A file 410 utilizes a blob for storage. In some example embodiments, the account 106 for the blob SS is the same account 404 utilized by the blob FS.

The blob container 402 is compatible with blob FS which treats the blob container 402 as a file system with default settings. Further, the blob file system 406, created through blob FS, works with blob SS, which treats the blob file system 406 as a blob container 402 and ignores additional metadata. The service metadata used by blob FS is kept separate from the user metadata.

A blob container 402 organizes a set of blobs 110, and all the blobs 110 reside within the respective blob container 402. In some example embodiments, a storage account can contain an unlimited number of blob containers 402 and a container can store an unlimited number of blobs 110. Further, FS can contain an infinite number of directories, and directories can contain an infinite number of directories and files.

Regarding the access to files via blob FS, the data I/O operations use offset and length parameters. Further, blob FS uses append commands to add data, and uses flush commands to commit to the data to disk. The append-file operations is for actually writing data, and the append operation writes the data to disk; the data is persisted, but not yet readable by a read-file operation. The flush-file operation commits the requested unflushed length recently appended so that it is readable by the read-file operation; this is not a data write, just an index write operation. Further, blob FS supports parallel reads and writes to the same file. Additionally, blob SS operations are compatible with a blob created with blob FS as a file. Further, the flush command is optimized to allow concurrent data appends while flushing, which greatly improves performance in applications that write data sequentially, such as transaction logs.

In the blob storage system 106, the storage namespace is defined in three parts: an account name, a container name, and an object name. As a result, data is accessible in storage system 20 via a URI of the form:

http(s)://AccountName/ContainerName/BlobName

An example, where janeaccount.blob.core.windows.net is the account name, mycontainer is the container name, and files/myblob.txt is the object name, is as follows:

http://janeaccount.blob.core.windows.net/mycontainer/files/myblob.txt

The account name is assigned to a customer for accessing storage and is managed by the DNS host name. The DNS translation for the account name is performed by the DNS 206 to locate the storage clusters 208 and the data center where the data is stored. An application may use multiple account names to store data across different locations. The partition key locates the data once a request reaches the storage cluster. The partition key is used to scale out access to the data across storage nodes based on traffic needs. When a partition key holds many objects, the object name identifies individual objects within that partition. The storage system 202 supports atomic transactions across objects with the same partition key value. An atomic transaction includes a plurality of operations to be executed by the cloud storage system such that all the operations are successful or none of the operations are executed and the atomic transaction is aborted. This naming approach enables the storage system to flexibly support multiple data abstractions. For example, with respect to Blobs, the full blob name is the partition key. A blob can have snapshots. Further, a row key, which identifies objects within a partition key, is AccountName; ContainerName;ObjectName; SnapshotVersion, so the system can transactionally operate on snapshots for the same file/object.

The object name may be optional because, for some types of data, the partition key uniquely identifies the object within the account. This naming approach enables storage system 202 to flexibly support multiple data abstractions. For example, with respect to blobs, the full blob name is the partition key, which has the format account;container;blob. In the example mentioned above, the partition key is janeaccount;mycontainer;files/myblob.txt.

The partition key for HS operations has the format account;filesystem;directory;file. The data is accessible in storage system 202 via a URI of the form:

http(s)://Accountname/FileSystem/Directory/File

An example, where janeaccount.dfs.core.windows.net is the account name, myfs is the file system, files is the directory, and myblob.txt is the file name, is as follows:

http://janeaccount.dfs.core.windows.net/myfs/files/myblob.txt

In some example embodiments, blob FS 102 provides an API for accessing the data, such as a REST API. Blob FS 102 is built on top of the blobs 110; therefore, blob FS 102 provides the features that users are used to with the blob SS, which means that no benefits are lost because of the implementation of blob FS.

Further, when using blob FS 102, the blob abstraction is hidden from users by providing access to files. The user does not need to configure access for the use of the different types of blobs, such as block blobs, append blobs, and page blobs. The user does not have to configure or select the blob type with blob FS.

Blob SS and blob FS share internal data formats, compression, and encryption mechanisms, and both can write different, distinct metadata but also share metadata for the same account/container/blob. Further, both interfaces use internal blob abstraction models implemented via internal tables maintained by the partition layer.

By building blob FS using the blob services, blob SS and blob FS may share features, such as encryption, object level tiering, soft delete, change notifications, virtual networks, geographic replication, object versioning, archive storage, lifecycle policy management, zone redundant storage, and so forth.

Figure 5:
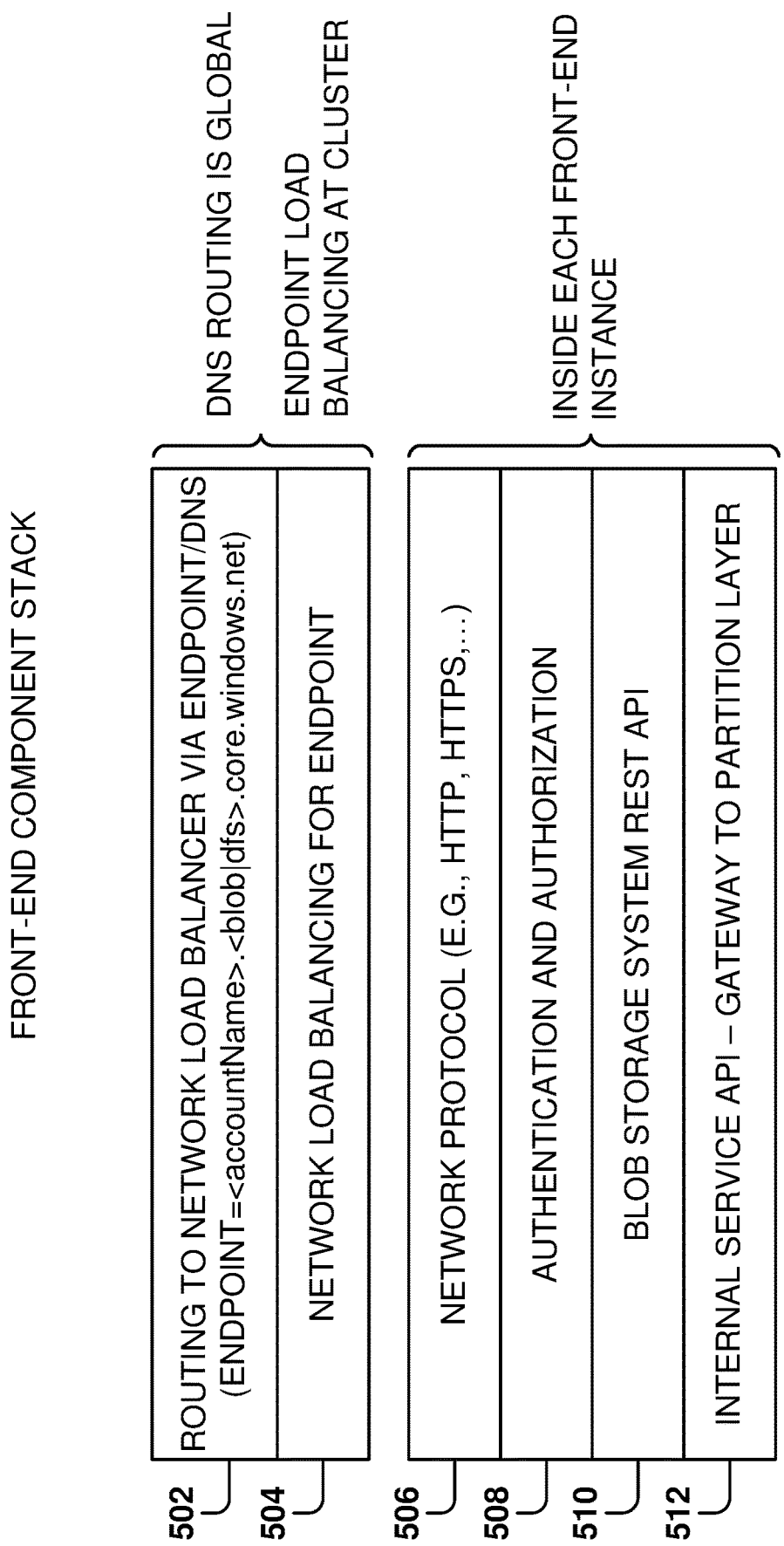
FIG. 5 illustrates the front-end component stack, according to some example embodiments.

FIG. 5 illustrates the front-end component stack, according to some example embodiments. The storage system supports multiple protocols and extensible metadata support.

Blob SS API and blob FS REST APIs are interoperable, and the data and the metadata are stored in the same objects.

Blob FS front end has an extensible architecture that supports multiple protocols. Blob SS and blob FS have separate endpoints in storage, and the endpoints are addressed by different DNS records for each storage account. The blob SS endpoints is addressed by <account>.blob.core.windows.net, and the blob FS by <account>.dfs.core.windows.net.

For each storage cluster, there is a VIP for each endpoint, so Blob SS and Blob FS have different VIPs for that cluster. Therefore, when a request is received, it is known which front end (either blob SS or blob FS) received the request without having to perform any parsing.

The network load balancing layers 504 chooses which FE instance corresponds to the FE type's VIP, and which instance/server will serve the request. The endpoint load balancing is performed at the cluster level, across all the front ends for that endpoint in the cluster.

Further, each instance of the front end in the cluster includes layers 506, 508, 510, and 512. The network protocol layer 506 is the transport for the request and the authentication and authorization layer performs parsing and authentication of the request.

The corresponding REST API 510 processes the request and then the internal service API 512 translate commands to the internal operations performed by the storage system and acts as a gateway to the partition layer.

In some example embodiments, at the storage account level, a user by default has FN, but in other embodiments, HN may be the default. The user can choose to enable HN when the storage account is created. If a storage account uses FN, both blob SS and blob FS use FN. If a storage account uses HN, both blob SS and blob FS use HN. The front ends for blob SS and blob FS understand both FN and HN. If the front end is serving a request for a storage account which has FN, then the front end directly talks to the blob internal service. If the front end is serving a request for a storage account which has HN, then the front end talks to the hierarchical namespace first, which traverses the namespace, for accessing a file, eventually giving back a pointer to a blob in the "blob internal service", and then the front end will access the blob.

While the blob SS and blob FS APIs support both FN and HN, blob SS and blob FS APIs do not provide the exact same functionality. The blob and file system functionality are different and provide different functionality. The blob SS provides pure key-value store style access to a blob, with no directory or file-system functionality. The blob FS provides file system functionality with directories, and operations such as rename directory, delete directory, etc. Additionally, with the blob FS API, certain functionality is enabled or improved by HN, such as atomic directory operations, directory operations, listing under a particular directory efficiently, etc.

Figure 6:
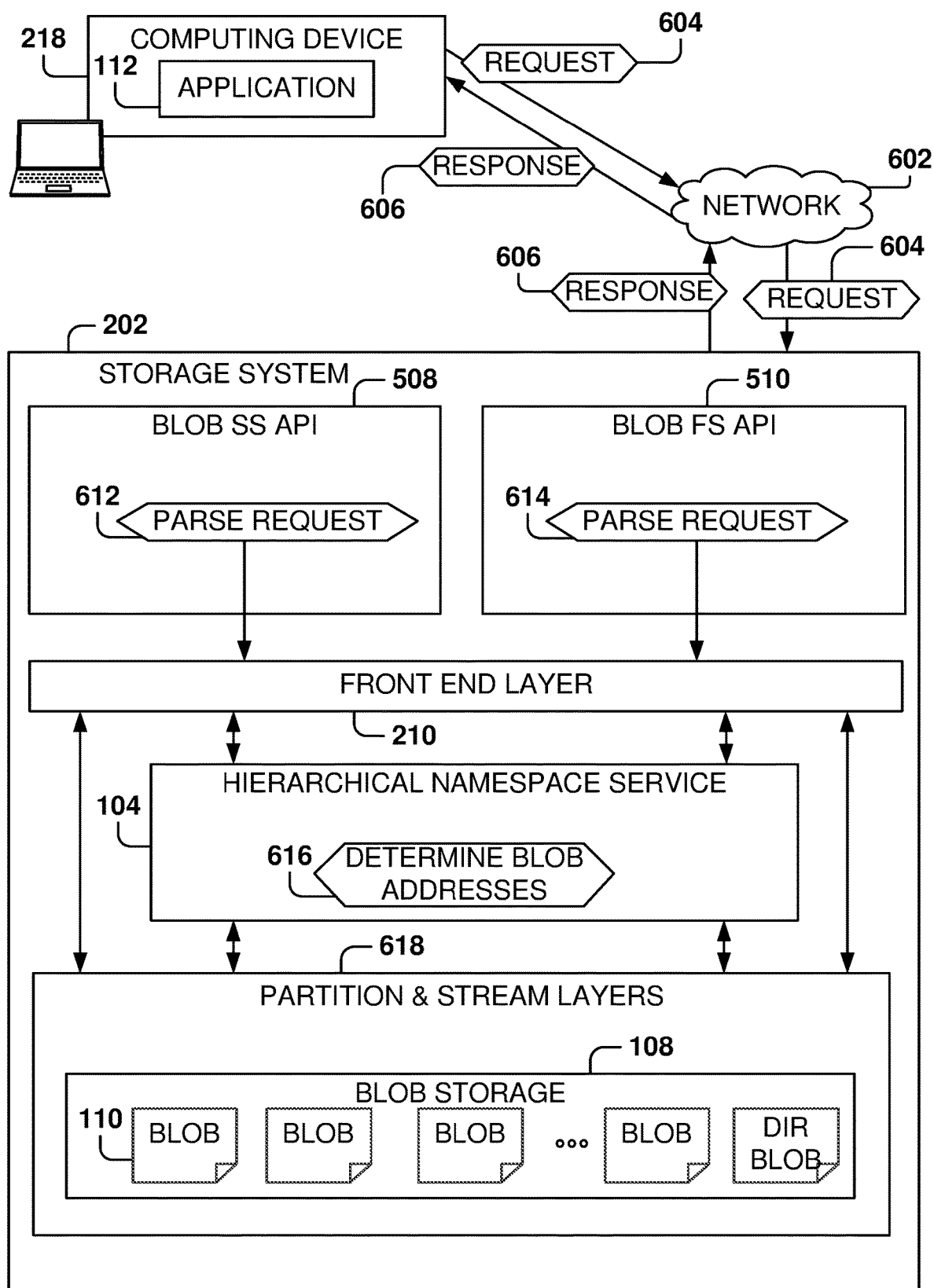
FIG. 6 illustrates the processing of a request by the storage system, according to some example embodiments.

FIG. 6 illustrates the processing of a request by the storage system, according to some example embodiments. Traditionally, cloud storage has provided general object storage features, but these systems have not provided utilities generally available in traditional file systems hosted on a single machine, a small number of machines, or in traditional distributed big-data file systems, such as first-class directory support, including reliable, efficient, and consistent directory operations. For example, to rename a blob, some cloud object storage systems create a new blob with the new name, copy the data in some fashion (either deep or shallow copy), and delete the old blob. If the user is utilizing the name of the blob to organize data (e.g., same name prefix to simulate a directory or a classification), to rename this simulated directory the cloud storage would have to copy all the blobs, which could be in the millions or higher.

Some cloud storage systems utilize the Apache Hadoop software library for the distributed processing of large data sets across clusters of computers using simple programming models. Apache Hadoop is designed to scale up from single servers to thousands of machines or more, each offering local computation and storage.

Most users would like, or rather expect, that their cloud object storage provides the same capabilities as the file systems that they are used to in single devices. In addition, users want cloud storage systems that can scale practically to an infinite amount of storage and not be limited by the cloud storage particular implementation. Blob FS is able to provide these services and the ability to scale out without limits.

Additionally, the services provided by cloud storage must provide consistency and robustness. Blob FS provides support for atomic operations that are strongly consistent. For example, if a directory is renamed, the user expects to see all the files in the directory immediately. If a system is simply using blob names to simulate directories, renaming a directory requires renaming possibly millions of blobs.

Some operations have to be atomic because, for example, the operations are used to implement exclusive access between processes in a cluster. These operations include, at least, creating a file, deleting a file, renaming a file, renaming a directory, creating a directory, and deleting a directory.

FIG. 6 illustrates the processing of a user request (e.g., read a file). The storage system 202 provides a blob SS API 508 and a blob FS API 510, which include a set of operations to access files utilizing the flat namespace and the hierarchical namespace.

Thus, the blob SS API 508 provides a feature to read a given blob inside a given container, while the blob FS API 510 provides a feature to read a given file having provided a path that includes one or more directories.

In the illustrated example, an application 112 in computing device 218 sends a request 604 to the storage system via network 602. If the request is for blob SS, blob SS API 508 parses 612 the request. If the request is for blob FS, blob FS API 510 parses 614 the request.

After the parsing, the request is sent to the front end layer 210. The front end layer 210 interacts with the partition and stream layers 618, as discussed above, to access the data from the blob storage 108 (e.g., read the requested blob 110).

If the request is for accessing a file, the front end layer 210 interacts with the hierarchical namespace service 104 to determine the blob address involved in the request (e.g., address of blob that stores the file of the read request). The hierarchical namespace servers 104 guarantees atomic execution of the request to guarantee that the request is either successful or unsuccessful, and the consistency of the storage system 202 is always maintained.

After the hierarchical namespace service 104 provide the address to the front end layer 210, the front end layer 210 may access the partition and the stream layer 618 to fulfill the request (e.g., read the data from the file). After the request is fulfilled, the storage system 202 sends a response 606 to the application 112.

It is noted that both blob SS API 508 and the blob FS API 510 are able to simultaneously access the same underlying blob storage 108. By leveraging the existing blob storage 108, implementing the new blob FS API 510 leverages the existing infrastructure for accessing the blobs while adding new features to the interface, such as the use of directories. The storage system 202 is regarded as being multiprotocol because the storage system 202 is able to simultaneously support more than one access protocol. For example, if a blob has certain properties that have been defined via the blob SS API 508, the blob FS API 510 is able to read these properties.

In previous implementations, multiprotocol support requires having different copies of the data, each copy structured for a different interface. However, this requires having multiple copies (which means an additional storage required) and having to synchronize the copies (which means increase computing resources and potential for synchronization problems). On the other hand, the multiprotocol support provided by the storage system 202 does not require multiple copies of the data because the multiple protocols access the same underlying data.

In addition, the blob FS API 510 hides the complexity of having to choose the blob type (e.g., block, page, append). In some example embodiments, blob FS monitors how the user writes and reads the data, and based on these monitoring, blob FS selects the type of blob for storing the file. For example, if the user typically writes the data sequentially (e.g., a log file), blob FS selects an append blob. If the user typically accesses a file with reads and writes at different locations, blob FS will select a page blob.

Figure 7:
FIG. 7 shows an example of paths and files in a hierarchical directory structure, according to some example embodiments.

FIG. 7 is shows an example of paths and files in a hierarchical directory structure 700, according to some example embodiments. The hierarchical directory structure 700 may include directories and files within the directories.

In this example, the hierarchical namespace may include the root "/", directories /path1 and /path2 below the root, files filet and filet within directory /path2, a directory path3 within directory /path2, and file file3 in directory /path2/path3.

The hierarchical namespace is used to provide the abstraction of having directories and paths with underlying blob storage. For example, to rename a directory, blob FS changes a table that maps the directory to the directory's name, instead of having to rename all the blobs inside the directory. One of the goals of the hierarchical namespace service is to provide fast and atomic operations over directories. The hierarchical namespace service provides atomic transactions that allows multiple operations on the blobs to execute atomically: all of the operations execute successfully or none of them are executed.

Figure 8:
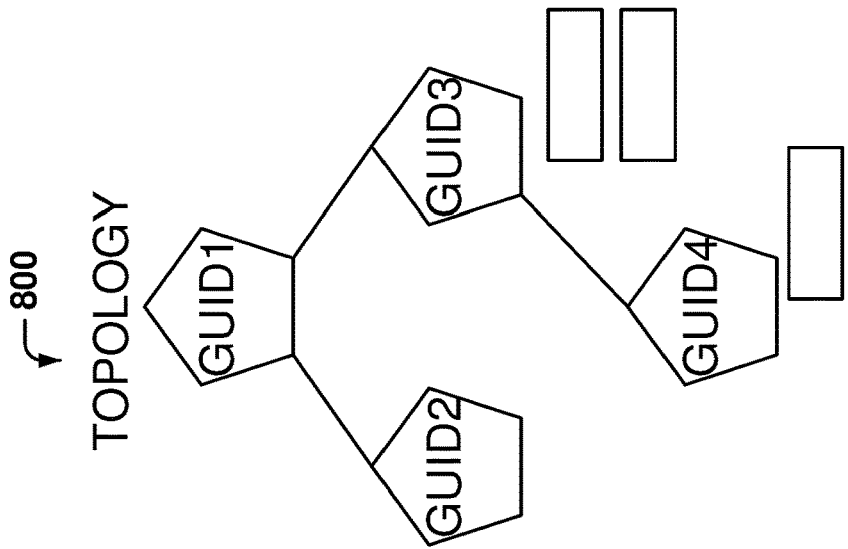
FIG. 8 shows a hierarchical namespace topology corresponding to the hierarchical directory structure, according to some example embodiments.

FIG. 8 shows a hierarchical namespace topology 800 corresponding to the hierarchical directory structure 700, according to some example embodiments. Topologically, the hierarchical namespace topology 800 is a tree, where the tree is formed of nodes and relationship of the nodes. The nodes may be directories or files (e.g., objects). Every node, except the root, has a parent and each node has a set of attributes, one of which is the name of the node. The node's name is unique for the nodes that have the same parent.

The names can change with no effect on the topology, and changes in topology do not affect names or properties. In the hierarchical namespace topology 800, each node is assigned a nonvolatile global unique identifier (GUID) that uniquely identifies the node. Thus, each file and directory has a unique GUID in the hierarchical namespace. Herein, the unique nonvolatile identifier is frequently referred to as a GUID, although this reference is for illustrative purposes. Embodiments are applicable to identifying file system objects, such as files and folders, using any type of unique nonvolatile identifier, such as a GUID, multiple GUIDs, a GUID plus timestamp, or any other type of identifier that does not change and is unique within the relevant scope of the storage system.

In the illustrated example, GUID1-GUID4 are unique identifiers corresponding to /, /path1, /path2, and /path3. GUID1 is the identifier for the root directory, GUID2 is the identifier for the /path1 directory under the root directory, GUID3 is the identifier for the /path2 directory under the root directory, and GUID4 is the identifier for the /path3 directory under the /path2 directory.

Figure 9:
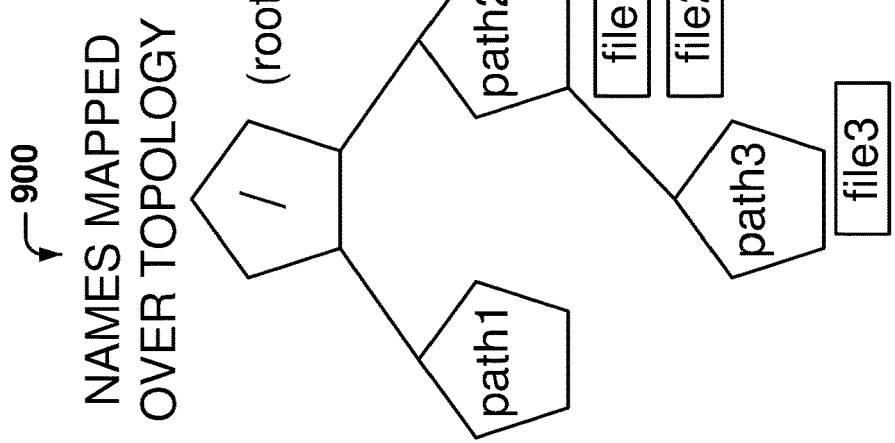
FIG. 9 shows the hierarchical namespace topology with path and file names overlaid, according to some example embodiments.

FIG. 9 shows the hierarchical namespace topology 900 overlaid with the path and file names, according to some example embodiments. Therefore, by comparing the hierarchical namespace topology 800 of FIG. 8 with the hierarchical namespace topology 900, it can be observed that GUID1 is the GUID for the root, GUID2 is the GUID for /path1, etc.

Figure 10:
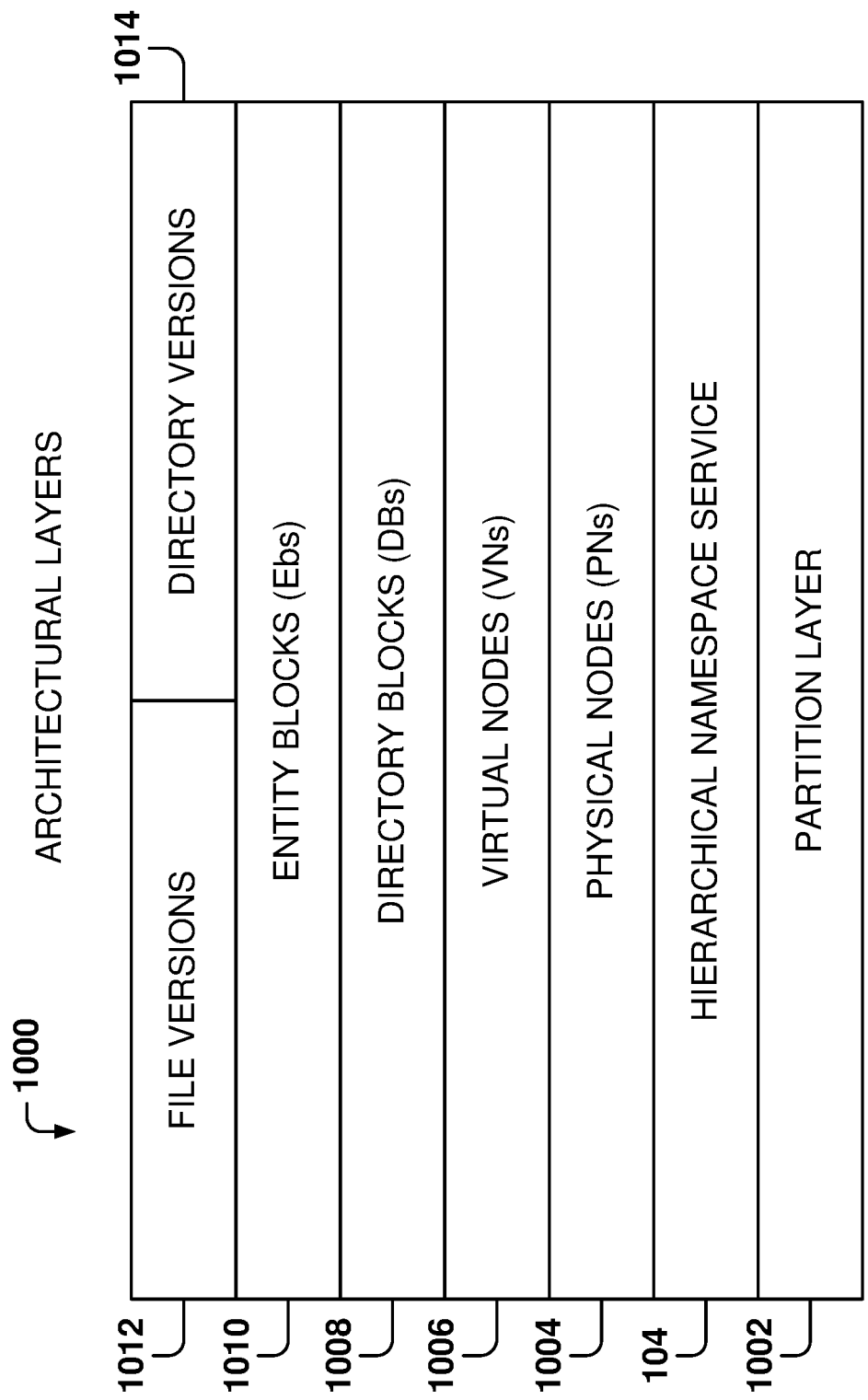
FIG. 10 shows an example architecture for implementing a hierarchical namespace service, according to some example embodiments.

FIG. 10 shows an example architecture for implementing a hierarchical namespace service, according to some example embodiments. In some example embodiments, the namespace management architecture 1000 is configured to present a storage system namespace, including mapping hierarchical file system commands to a flat file system. The namespace management architecture 1000 includes a partition layer 1002, the hierarchical namespace service 104, physical nodes 1004, virtual nodes 1006, directory blocks 1008, entity blocks 1010, one or more file versions 1012, and one or more directory versions 1014.

The partition layer 1002 is configured to manage data structures that manage aspects of the storage service, such as data objects (e.g., blobs, files, directories, etc.), queues, etc. For example, the data structures may have the form of tables, and may track objects in storage, such as by including identifiers for the objects, indicating locations (e.g., partitions) where the objects are stored (e.g., indicated by partition keys), timestamps for storage of the objects, etc. In some example embodiments, each row of a table may have a schema, and may be accessed by a partition key and a row key, referred to as a primary key of the row. The partition layer 1002 maintains a namespace table (also referred to herein as a "master directory block map") as a persistent store of the namespace state and of the managed partitions of the storage cluster. The master directory block map may maintain a mapping between hierarchical namespace identifiers (e.g., path names) of file system objects and flat namespace identifiers (e.g., GUIDs) of those file system objects as well as an indication of the parent-child relationships between the file system objects.

The hierarchical namespace service 104, as described above, is a service that receives file system commands that refer to file system objects using hierarchical namespace identifiers, maps the hierarchical namespace identifiers to flat namespace identifiers, and then applies the commands against the file system objects in a flat namespace using the flat namespace identifiers. In an embodiment, the hierarchical namespace service 104 contains and manages physical nodes 1004, which manage virtual nodes 1006 that perform the namespace mapping.

In some example embodiments, each physical node of the physical nodes 1004 may be implemented as a physical machine. For example, a physical node may be implemented as a physical server. The physical server may execute and/or implement one or more of virtual nodes 1006, such as by executing a hypervisor that presents a virtual operating platform, and virtual nodes may run upon in the form of virtual machines. Many physical nodes may be present in a storage cluster, such as one thousand nodes or other number.

The number of virtual nodes 1006 managed by physical nodes 1004 may be scalable, or may be a predefined static number. The virtual nodes 1006 may be moved between physical nodes 1004. For example, if a first virtual node is too busy (e.g., operating over a processor utilization level threshold) and a second virtual node is also busy, and they are both managed by (e.g., running upon) the same physical node, one of the virtual nodes may be transferred to another physical node that is available and has enough resources. As such, load balancing may be performed by shifting resources between physical and virtual nodes. The virtual nodes 1006 may each maintain their state in a persistent storage so that at any time, a virtual node may be moved and/or restarted on a different physical node 1004. In an embodiment, a different identifier (e.g. a numeric identifier (ID)) is associated with each of virtual nodes 1006, and only one instance of a virtual node having a given identifier is running at any given time.

The directory blocks 1008 correspond to hierarchical namespace directories. In general, a single directory block corresponds to a single directory. When a directory is created, a GUID is generated and assigned to the directory to become a permanent name of the directory. In an embodiment, a hash function is performed on the GUID to generate a hash result. The hash result is used to determine a permanent place for the directory block of the directory. In particular, in some example embodiments, the directory is assigned to a virtual node having a numeric ID that matches the hash result, and that assignment does not change unless load balancing takes place. The directory is permanently managed by that virtual node via the GUID.

The directory blocks 1008 are managed by respective virtual nodes 1006, with every directory block corresponding to a directory (root or sub-) or a portion of a directory in the hierarchical namespace. Inside the directory block 1008 are entity blocks 1010, with each entity block being a file or a folder inside the directory. Note that any number of directory blocks 1008 and entity blocks 1010 may be managed by the hierarchical namespace service 104, including numbers in the billions or higher.

Each entity block 1010 may have multiple versions, each version associated with a different time period. A file entity block has one or more versions indicated as file version(s) 1012, and a directory entity block has one or more versions indicated as directory version(s) 1014. Any number of versions may be present for directory blocks 1008 and entity blocks 1010, including numbers in the hundreds, thousands, or even greater numbers of versions. The versions of an entity block are contained behind the specific name. For example, if attributes of a file named "foo" are changed, a new version of "foo" is generated, and all versions of "foo" share the same name. The entity block versions enable using multi-version concurrency control (MVCC). According to MVCC, the namespace is capable of executing transactions not only at the current moment for an entity block, but also for the entity block at points in the past, by executing a transaction against an earlier version of the entity block that was current at the time the transaction was received (e.g., as verified by comparing timestamps).

FIG. 11 shows an example master directory block table, according to some example embodiments. As mentioned above, the partition layer 1002 may manage data structures that map file system objects, such as folders and files, in a hierarchical namespace to file system object identifiers in a flat namespace, and that indicate parent-child relationships between the file system object. Such data structures for mapping may have any form, such as the form of tables. For instance, FIG. 11 shows an example master directory block table 1100, in accordance with an example embodiment.

The master directory block table 1100 is an example of a data structure that may be used to map hierarchical namespace identifiers of file system objects to flat namespace identifiers and to identify parent-child relationships between the file system objects. The master directory block table 1100 identifies the objects contained in each directory. The master directory block table 1100 includes a directory block identifier (DBID) column 1102, a name column 1104, a commit time (CT) column 1106, and an entity block identifier (EBID) column 1108, and may optionally include further columns such as a deleted indication column (the "delete flag"), a file indication column, and any other additional columns that may be required.

The master directory block table 1100 may be managed by the partition layer 1002 of FIG. 6, while the hierarchical namespace service 104 may manage a version of the master directory block table 1100 that is distributed over many locations. For instance, each virtual node may maintain and manage a corresponding portion of the master directory block table 1100, referred to as a directory block map. For example, the master directory block table 1100 is shown segmented into four portions 1110A-1110D. The four portions 1110A-1110D correspond to a particular set of one or more directory blocks and entity blocks in storage in the form of one or more rows. Furthermore, each of the four portions 1110A-1110D may be managed by a corresponding virtual node, although one virtual node may also manage several portions. For instance, a first virtual node may maintain first portion 1110A, a second virtual node may maintain second portion 1110B, a third virtual node may maintain third portion 1110C, and a fourth virtual node may maintain fourth portion 1110D. By distributing the maintenance of the master directory block table 1100 across the virtual nodes in this fashion, the performance of the hierarchical namespace service 104 is improved and the ability to grow the master table is not limited because additional nodes may be added as the storage demand grows.

The directory block identifier (DBID) column 1102 stores an identifier for each directory block (e.g., each directory) in the form of a DBID. The DBID is a unique identifier that never changes for a particular directory block. In one embodiment, the DBID is a 128-bit value generated for every new directory block.

The entity block identifier (EBID) column 1108 stores an identifier for each entity in the form of an EBID. When the entity is a directory, the EBID of the directory is also the DBID of the directory. When the entity is a file, the EBID is the GUID of the file that never changes for that file. If an entity block has multiple versions, the versions are listed in corresponding rows in the directory block map. The different versions represent different states of the file or directory of the entity block at different time intervals.

In the example of FIG. 11, three versions of a same entity GUID-FILE4 (for file1) are listed in row entries 6, 7, and 8. Rows 6, 7, and 8 list the same DBID and EBID, but have different values in the commit time (CT) column 1106, which indicates a time at which the respective version of the entity block was committed to storage. As such, a version of the entity block is valid for reading only when a transaction read timestamp (RT) of a command directed to the entity block has a value between the commit time of the version and the commit time of the next newer version of the entity block, unless the version corresponds to the most recent commit time, in which case the most recent version is valid for all RTs following the most recent commit time. In this manner, a command may act on the version of an entity block that was valid at the time the command was issued, rather than on the most recent version of the entity block.

Accordingly, in the master directory block table 1100, each row represents a version of an entity block. The primary key (PK) for the master directory block table 1100 is the DBID. The row key (RK) is the name (in name column 1104) for the entity block and the commit time. Table 1 below shows example types and description for various columns that may be present in the master directory block table 1100, including the columns shown in FIG. 11.

TABLE 1

| Key | Column/Name | Type | Description |
| --- | --- | --- | --- |
| PK | DBID | Binary | Unique Directory Identifier |
| RK | Name | Char | File or Directory name (e.g., UTF-8) |
| RK | Commit time | Char | The first transaction when this version in EB visible (deleted) |
|  | Deleted | Bit | Is this a delete record? |
|  | File | Bit | Is this file? (otherwise is directory) |
|  | EBID | Binary | Unique Entity Block Identifier |
|  | . . . |  | Additional Columns for every associated property. |

It is to be noted that the types for the variables in the table may have variables of different sizes. In an embodiment, the data in master directory block table 1100 is rendered immutable. When a directory is deleted, a new row is added with the value of the Del flag set to "yes." Further, when a file is deleted, the value of the Del flag is set to "yes" and the file will be invisible for any time after the CT of the file-delete operation.

To rename a file or a directory, the current entry in the table is deleted (Del flag set to "yes") and a new entry with the new name is added. Create, update, and delete commands add a new row in the table. Garbage collection (GC) may be implemented to removes old rows from the table at predetermined intervals or as otherwise configured.

When a client (e.g., application 112 of FIG. 2) changes a file or directory property, the change is indicated in the directory block of the parent directory of the file or directory. For example, the result of changing an access attribute of a file is the insertion of a row in the master directory block table 1100 with a DBID of the parent directory, the name 1104 of the file, an EBID equal to the file's GUID, and the new value of the attribute.

However, there are directory properties that the client can change indirectly. For example, the last write timestamp for a directory changes when a client creates a new file in the directory. In those cases, each directory may have a special file (e.g., with internal name ".") referred to as a "dot file," where directory attributes, such as internally maintained properties and customer-set properties, that may change are maintained. On predefined intervals, some properties from the dot file are copied to the properties in the parent directory's directory block where the client can view them. For example, an NTFS last read time may be propagated to the client's section once every hour. The propagation can be performed on a more complex schedule. For example, when a directory timestamp changes, the updated time is propagated to the parent directory first immediately and then later after a predefined period of time.

As mentioned above, a directory block map is a distributed portion of the master directory block table 1100 that is associated with a virtual node. Each virtual node maintains a corresponding portion of master directory block table 1100 as a directory block map. In some example embodiments, the directory block map is maintained in main memory, and the directory block map may maintain data, such as the directory block and entity block identifiers, in the form of a hash table and tries. The memory representation is optimized for supporting live transactions and keeping a small part of hot data.

For every entity block listed in a directory block map of a virtual node, rows for the last few versions are maintained with information about the state of transactions and a flag that shows whether or not there are more earlier (older) versions in the master directory block table 1100. An entity block's versions are a list of entity blocks, and the list grows from the head. If too many entries are in the list, the oldest entries can be discarded, and an indication may be made at the tail of the list that more versions are stored in master directory block table 1100 and/or in one or more name resolution caches. In memory, a directory block provides quick access to the mapping between client-specified names (of name column 1104) and EBIDs (column 1008).

In an embodiment, an additional data structure is provided as another distributed form of the master directory block table 1100. The additional data structure is referred to as a name resolution cache, and forms a distributed cache service. Each virtual node may have an associated name resolution cache. The name resolution cache is used by virtual nodes that are configured to perform a name resolution function that maps hierarchical namespace directory names (or paths) to DBIDs. Such name resolution nodes may obtain the necessary name-to-DBID mappings from other virtual nodes (referred to herein as storage nodes), but afterward store those name-to-DBID mappings in a local name resolution cache so that subsequent name resolution operations can be performed more efficiently. Each virtual node may have an associated name resolution cache. The nature of the service provided by the name resolution cache is a key value store. The key is sequence of bytes. The name resolution cache supports sparse streams as values.

For example, a value may have 3 versions: v1, v2, and v3. At offset timestamp 1 (TS1) through offset timestamp 2 (TS2), v1 can be written, at offset TS2 through offset timestamp 3 (TS3), value v2 can be written, and from offset TS3 until an end of the name resolution cache (e.g., offset $2^{64}$), value v3 can be written. Subsequently, the name resolution cache can be read at any offset of the stream and the name resolution cache will return the correct value.

Entity blocks and directory blocks may be cached in a name resolution cache by a virtual node. With regard to an entity block, the name resolution cache key is DBID+EBID. A stream may be written into an entity block version between the offsets of the commit transaction that introduced the data and the commit transaction for the next version. The read of the entity block is performed by a specific timestamp that is used as the offset in the stream. The name resolution cache returns the data stored within a range in which the offset falls. When a newer value is stored, the previously stored values are rewritten. With regard to a directory block, the name resolution cache key is DBID+EBID. Timestamps of earlier requests are written into the stream list of EBIDs.

If, upon a read operation, the name resolution cache returns data, the data is considered correct until some point in time. This point of time could be the current time or a time in the past. The namespace data is immutable, so there is no issue that could result in reading invalid data, but there might be a newer version of the data that has not been uploaded in the name resolution cache. In this case, the results from local memory (the directory block map) and the name resolution cache are combined. Because the name resolution cache is updated with every write to the master directory block table 1100, if no newer version is present in the directory block map, the name resolution cache version is the latest.

Accordingly, embodiments of a hierarchical namespace service implement maps for mapping between namespace identifiers of file system objects and flat namespace identifiers of those file system objects at multiple levels, including master directory block table 1100, the directory block maps at the virtual nodes (distributed), and the name resolution caches at the virtual nodes (distributed), providing redundancy, greater efficiency (e.g., reduced traffic in requesting mapping information), and faster operation (e.g., via faster access to nearby mapping information, storing hashes of identifiers for faster compares, etc.).

Figure 12:
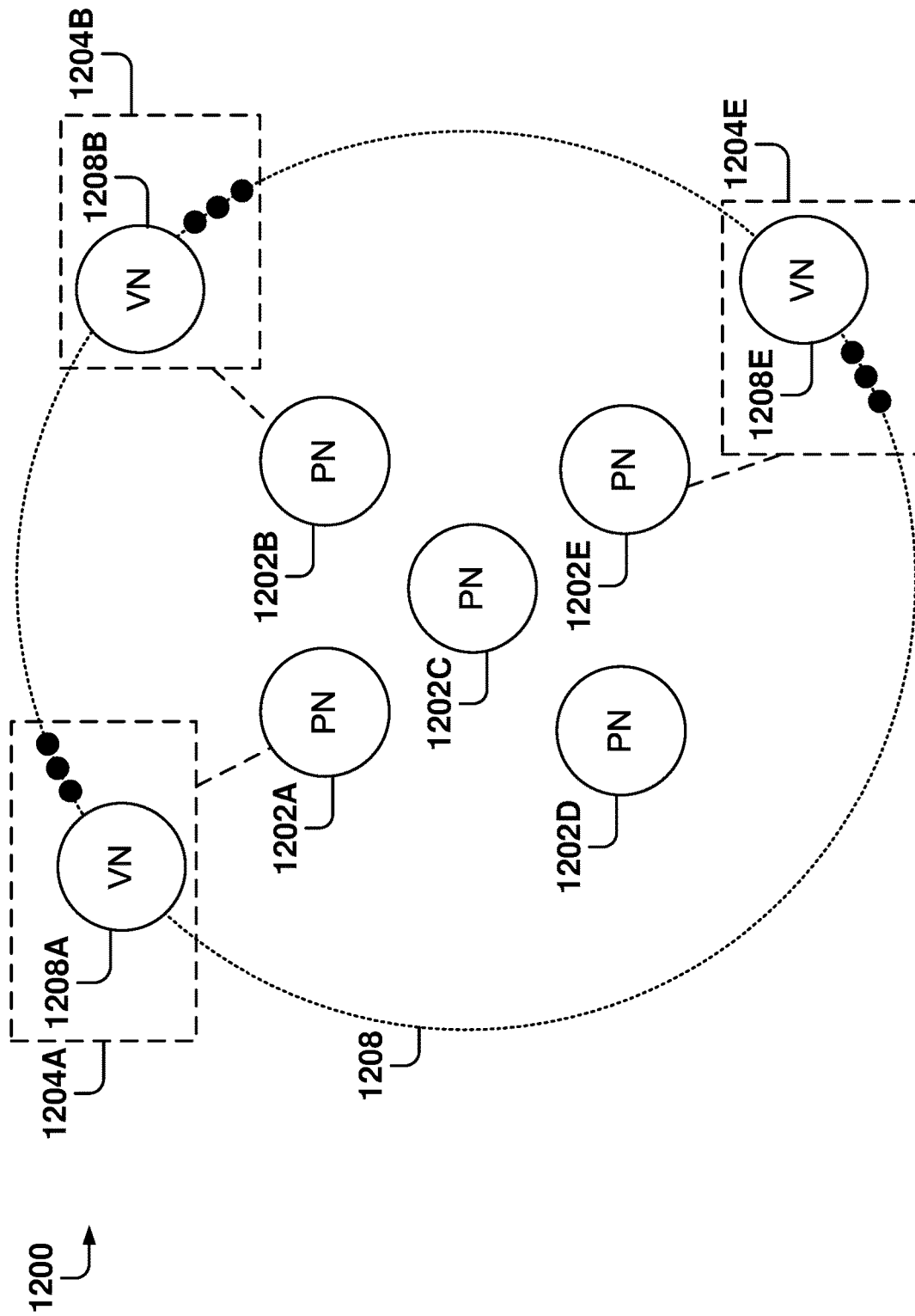
FIG. 12 shows a block diagram of a hierarchical namespace service that includes physical nodes and virtual nodes, according to some example embodiments.

FIG. 12 shows a block diagram of a hierarchical namespace service that includes physical nodes and virtual nodes, according to some example embodiments. The hierarchical namespace service 1200 may be implemented in physical and virtual nodes in various ways to use the mapping information to process file system transaction requests. The hierarchical namespace service 1200 includes a plurality of physical nodes 1202A-1202E and a plurality of virtual nodes 1208 (represented as situated on the dotted circle).

The virtual nodes 1208 includes a first set of virtual nodes 1204A, a second set of virtual nodes 1204B, and a third set of virtual nodes 1204E. The first set of virtual nodes 1204A includes a first virtual node 1208A and optionally one or more further virtual nodes. The second set of virtual nodes 1204 includes a second virtual node 1208B and optionally one or more further virtual nodes. The third set of virtual nodes 1204E includes a third virtual node 1208E and optionally further virtual nodes.

In an embodiment, the physical nodes 1202A-1202E execute in one or more servers as physical machines (not shown). Any number of physical nodes may be present, including numbers in the tens, hundreds, thousands, and even greater numbers of physical nodes. Each physical node is independent and communicates with the other physical nodes and virtual nodes.

Any number of virtual nodes may be present, including numbers in the tens or hundreds of thousands, and even greater numbers of virtual nodes. A virtual node may be implemented in various ways, including as a virtual machine that runs on a physical node.

Each set of virtual nodes is managed (e.g., hosted/run) by a corresponding physical node. For example, physical node 1208A manages the first set of virtual nodes 1204A, physical node 1202B manages the second set of virtual nodes 1204B, and physical node 1202E manages the third set of virtual nodes 1204E.

Each virtual node manages a respective set of directory blocks, where each directory block is a respective partition of a storage namespace. The namespace table maintains a mapping between hierarchical namespace identifiers (e.g., path names) of file system objects and flat namespace identifiers (e.g., GUIDs) of those file system objects as well as an indication of the parent-child relationships between the file system objects. In an embodiment, each of the virtual nodes of sets of virtual nodes 1204A, 1204B, and 1204E may manage a respective set of one or more directory blocks, although some virtual nodes may be managing zero directory blocks at a particular time.

Accordingly, the hierarchical namespace service 1200 provides for the management of a namespace used to address file system objects in storage, and may be implemented in the form of physical nodes and virtual nodes.

In some example embodiments, each virtual node has a write-ahead log, and updates, that happen in the virtual node, first go to the write-ahead log. The write-ahead log is stored in persistent storage, so if a virtual node goes down, the virtual node may be restarted on the same or different physical node, and continue with the pending operations at the time that the virtual node crashed by checking the write-ahead log.

Figure 13:
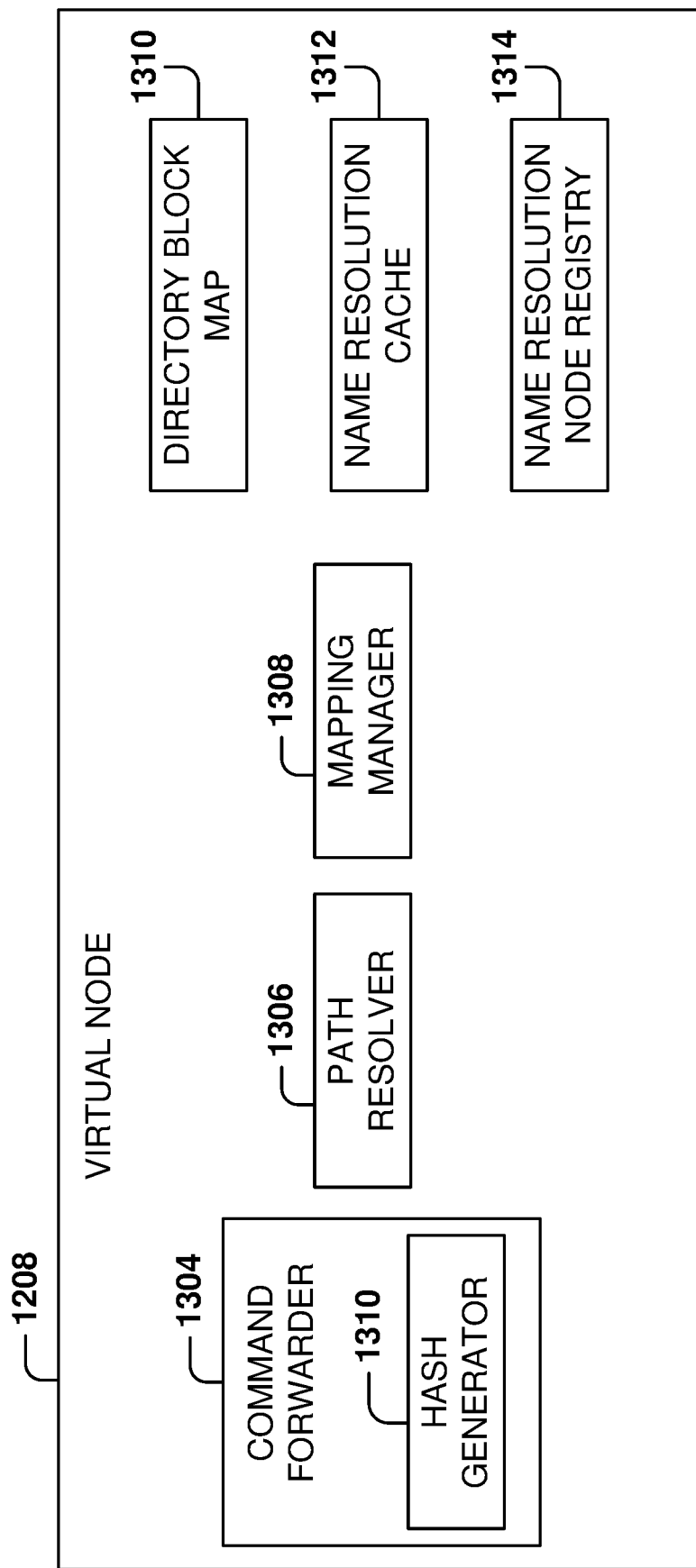
FIG. 13 shows a block diagram of a virtual node, according to some example embodiments.

FIG. 13 shows a block diagram of a virtual node 1208, according to some example embodiments. The virtual node 1208 includes a command forwarder 1304, a path resolver 1306, and a mapping manager 1308. The command forwarder 1304 includes a hash generator 1310. Furthermore, the virtual node 1208 maintains a directory block map 1310, a name resolution cache 1312, and a name resolution node registry 1314.

The command forwarder 1304 of virtual node 1208 is configured to receive commands containing file system operations directed to entity blocks stored in the storage cluster managed by the hierarchical namespace service. When a client sends a command directed to a file system entity block, the client uses the name of the file or the directory (e.g., a hierarchical namespace identifier of the file system object), including the path name to the file or directory. In an embodiment, when the virtual node 1208 is not the virtual node that manages the identified file or directory, the virtual node 1208 operates as a "query node" to forward the received command for processing. In such a case, the command forwarder 1304 determines another virtual node (referred to as the "name resolution node") to handle identifying still another virtual node that manages the file or directory (referred to herein as the "storage node") and therefore is configured to execute the command. In an embodiment, the hash generator 1310 of command forwarder 1304 may perform a hash function on the path name, such as a CRC64 algorithm or other suitable hash function, to generate a hash result. The hash result identifies the name resolution node. The command forwarder 1304 forwards the received command to the identified name resolution node.

The path resolver 1306 of virtual node 1208 is configured to receive commands from query nodes, resolve directory names (or paths) included in those commands to flat namespace identifiers, and use the flat namespace identifiers to identify the virtual nodes that are the storage nodes for managing the directories or files to which the commands are directed. In particular, for a given command, path resolver 1306 resolves a directory name or path included in a command to a DBID. The name resolution is performed efficiently and in a manner that is strongly consistent with respect to all transactions. It is noted that the mapping between a path name and a DBID may change, such as when a directory is renamed, and this may affect name resolution caching for all the children of the renamed directory, including indirect children of the directory. In some cases, name resolution cache 1312 of virtual node 1208 may store a mapping of the path name to the DBID of the file or directory in the command. In such a case, path resolver 1306 may forward the command to the storage node of that DBID. Otherwise, path resolver 1306 resolves the storage node by processing the path name.

In particular, the path resolver 1306 may begin processing the path name in the command at the root, and work its way down path portion by path portion, to determine the relevant storage node for executing the command. In particular, for the path name of /path1/path2, the path resolver 1306 may communicate with the virtual node managing the root partition to determine the DBID for the first directory in the path name (e.g., /path1). The virtual node managing the root partition finds the first directory in its directory block map 1310, and supplies the DBID back to the path resolver 1306. Then, the path resolver 1306 may communicate with the virtual node that manages the directory block for that DBID to determine the DBID for the second directory in the path name (e.g., /path2). The virtual node managing /path1 finds the second directory in its directory block map 1310, and supplies the DBID back to path resolver 1306. This process may be repeated for any further path name portions. Eventually, the path resolver 1306 determines the DBID for the directory block that contains the entity block to which the command is directed, and transmits the command to the storage node that manages that directory block.

With the path resolver 1306, any virtual node can find and return DBIDs for a path at a specific RT (read timestamp). In the process of finding the mapping, the path resolver virtual node 1208 also registers for notifications with all DBID owners of the path for a time period, such as 1 hour, in their corresponding name resolution node registries 1314. If a change occurs anywhere in the path name before the time expires, the corresponding manager of that path name portion notifies every virtual node registered for that path name that the change occurred, and the entry for that path name in name resolution cache 1312 for the registered virtual nodes is invalid.

Note that the registration at the storage node may have a predetermined expiration time (lease), such as 1 minute. If in the next time period (e.g., 45) seconds, a new request is received by the name resolution node with regard to the same entity block, the name resolution node resolves the name using its name resolution cache 1312 without sending new registration messages to the DBID owner(s). After that, if a new request is received by the name resolution node, the name resolution node again registers with the DBID owner(s).

The mapping manager 1308 of virtual node 1208 is configured to process commands for a storage node that are received from name resolution nodes. For instance, mapping manager 1308 may apply the name and timestamp in the received command as a key to the directory block map 1310 of the virtual node 1208 to determine the entity block to which the command is directed. Then, the command may be executed by virtual node 1208.

Figure 14:
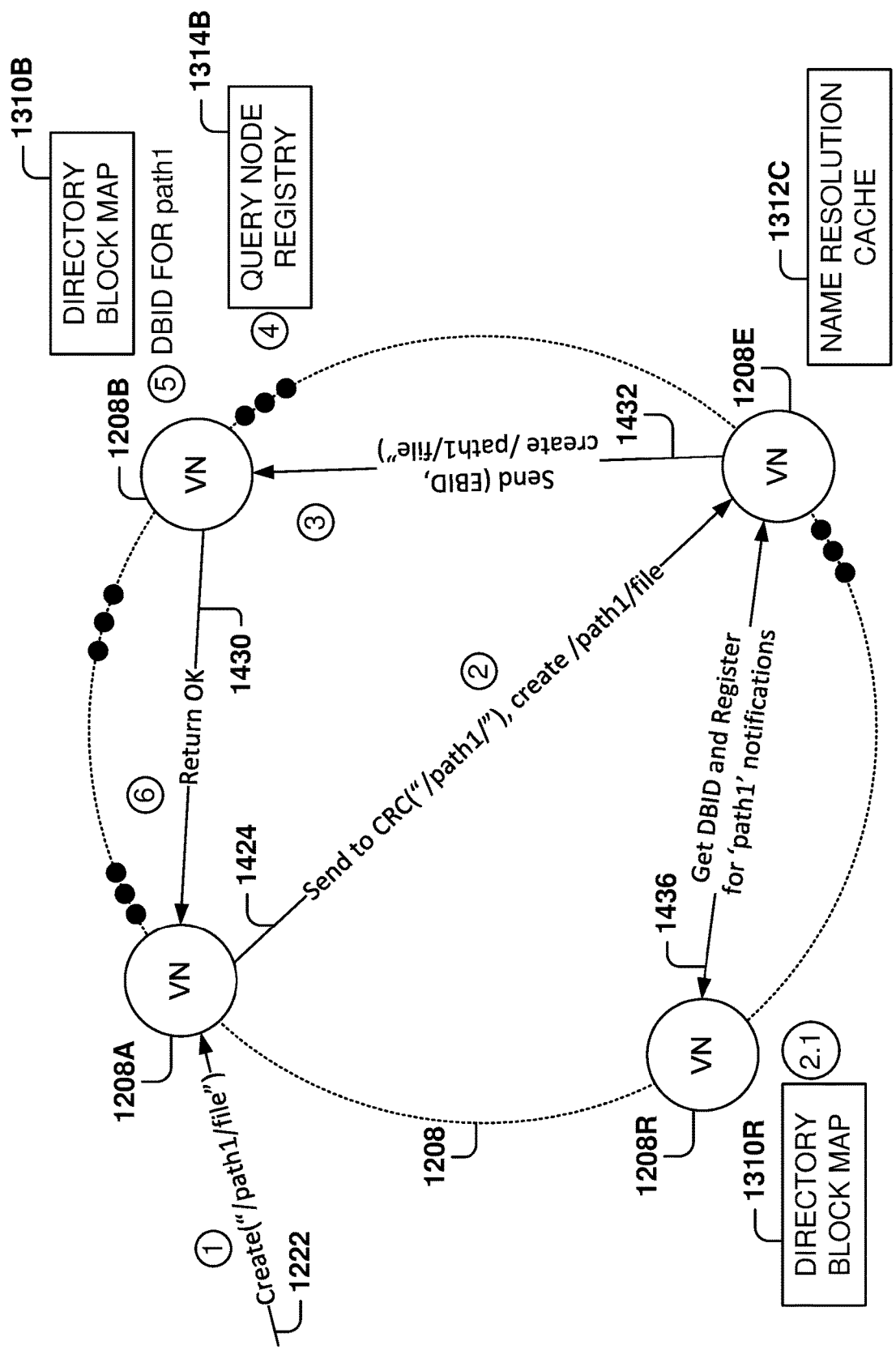
FIG. 14 shows a block diagram of the hierarchical namespace service where virtual nodes forward a command to a virtual node that manages an entity block identified in the command, according to some example embodiments.

FIG. 14 shows a block diagram of the hierarchical namespace service where virtual nodes forward a command to a virtual node that manages an entity block identified in the command, according to some example embodiments. The virtual nodes 1208 communicate with each other. When a first virtual node wants to communicate with a second virtual node, the first virtual node asks a first physical node, hosting the first virtual node, to connect a second physical node that hosts the second virtual node, to send a message. Every virtual node is capable of receiving requests from the client.

In the illustrated example, the hierarchical namespace service includes virtual nodes 1208A, 1208B, 1208E, and 1208R. A directory block map 1310B and a name resolution node registry 1314B are shown for virtual node 1208B, a name resolution cache 1312C is shown for virtual node 1208E, and a directory block map 1310R is shown for virtual node 1208R. Other physical nodes, virtual nodes, directory block maps, name resolution node registries, and name resolution caches are not shown in FIG. 14 for ease of illustration. Note that the communications shown in the form of arrows are shown as occurring between virtual nodes, but are actually communicated between virtual nodes by the hosting physical nodes.

In the illustrated example, virtual node 1208 receives a command 1222 (e.g., create /path1/file) directed to a first file system object, the command indicating a path (e.g., /path1/file) or directory name in the hierarchical namespace associated with the first file system object. The Command 1222 may include a file system operation directed to an entity block stored in the storage cluster with namespace mapping managed by the hierarchical namespace service 1200. As such, the command 1222 may have been forwarded to the hierarchical namespace service 1200.

The command 1222 involves a target entity, a hierarchical path name to the entity, and an operation to perform on the target entity, and may further include an associated timestamp indicating a time of receipt.

A hash function is performed on the path or directory name to generate a first node identifier for a name resolution node of the virtual nodes. In an embodiment, hash generator 1310 of command forwarder 1304 may perform a hash function on the path name or directory name of command 1222, such as a CRC64 algorithm or other suitable hash function, to generate a hash result. The hash result identifies the name resolution node. A motivation for this is to send all the requests for resolving the same path name to the same virtual node. If the same virtual node resolves the path name to the DBID, fewer virtual nodes will register for notifications. Furthermore, this approach improves the effectiveness of the name resolution caching as it increases the likelihood of cache hits.

The command is forwarded 1424 to the name resolution node (virtual node 1208E in this example) to determine a storage node to handle the command. The command forwarder 1304 in virtual node 1208A is configured to forward the received command 1222 to the identified name resolution node. In this example, virtual node 1208A forwards 1424 the command 1222 to virtual node 1208E. The virtual node 1208E is identified as the name resolution node by virtual node 1208A based on the hash result.

In an embodiment, virtual node 1208A selects another virtual node in hierarchical namespace service 1200 to handle the name resolution for command 1222. The virtual node may be selected in any manner, including by selecting the next virtual node in a sequence of virtual nodes (e.g., by virtual node identifiers), by selecting the next virtual node randomly, or selecting the next virtual node in another fashion.

The command is forwarded to the next virtual node to determine the storage node. The command forwarder 1304 is configured to forward received command 1222 to the next identified name resolution node as forwarded command 1424. In this manner, the name resolution requests can be distributed across multiple virtual nodes. This allows distributing the load across multiple virtual nodes, and handling the case when a busy virtual node is managing a directory that stores billions of files, for example.

Note that in an embodiment, command forwarder 1304 of a query node may be implemented as a client library. When the client library sends a command to the name resolution node, the response to the command may be returned to the query node directly from the storage node that executed the command. This minimizes the number of messages sent back and forth. The query node may or may not be clock synchronized with the rest of the virtual nodes of the storage cluster. As such, the client library is configured to manage transactions, but does not execute the commands.

Further, the storage node corresponding to the path is determined. In an embodiment, path resolver 1306 of virtual node 1208E may determine the virtual node 1208R managing the DBID corresponding to the path name in forwarded command 1424. In an embodiment in which the next virtual node in a sequence is selected, this may be carried out by adding a predefined number (e.g., 1) to an identifier of the previously-selected virtual node to obtain an identifier of the next-selected virtual node. An approach that always selects the same next virtual node will tend to improve the benefits of name resolution caching by increasing the likelihood of cache hits.

The virtual node 1208E may communicate 1436 with virtual node 1208R that manages the root directory via node resolution communications 1106. The virtual node 1208R accesses its directory block map 1310R, which maps the path portion in the path name of command 1222 to a GUID, and returns the GUID to virtual node 1208E. The path resolver 1306 at virtual node 1208E continues working through the path name, portion by portion, communicating with the virtual node managing each path portion to determine the corresponding DBID, until the entire path name is traversed and the storage node is determined. In an embodiment, path resolver 1306 communicates with the physical node that manages virtual node 1208 to determine the virtual node that owns the root director and each determined GUID. The physical node may have access to master directory block table 1100, which includes the mapping of all path portions to GUIDs, including the root, and thus can find each virtual node that path resolver 1306 needs to communicate with based on the GUID determined from the prior virtual node.

The command is forwarded 1432 to the determined storage node, virtual node 1208B, that has a directory block map containing an entry that maps the first file system object to an entity block identifier in the flat namespace. The path resolver 1306 is configured to forward the command to the storage node. The virtual node 1208B is identified as the storage node by virtual node 1208E due to owning the DBID of the command path name.

The entity block identifier and a timestamp are registered in a cache associated with the virtual node. In an embodiment, path resolver 1306 is configured to store the entity block identifier determined for the command in an entry in name resolution cache 1312, along with a timestamp, and the path name of the command. In this manner, when a future command is received that includes the path name, path resolver 1306 can determine the storage node merely by reference to the entry in name resolution cache 1312. In an embodiment, path resolver 1306 may receive the entity block identifier from the storage node in a notification message, and may store the entry in name resolution cache 1312 in response.

It is to be noted that entries in name resolution cache 1312 may timeout, and thus become invalid, after a predetermined amount of time passes from the timestamp value, such as one minute, one hour, or other time period. Furthermore, path resolver 1306 may receive an invalidate cache entry notification from the storage node for the entry in name resolution cache 1312, and in response, may indicate the entry as invalid. Similarly, path resolver 1306 may receive an invalidate cache entry notification from other virtual nodes that path resolver 1306 communicated with to resolve DBIDs for the path portions of the path name in the command, when any of those other virtual nodes determine the path portion they resolved has become invalid (e.g., due to a directory name change, etc.).

In an embodiment, a name resolution node may determine the transaction read sequence (RS) number Transaction.RS as current time minus a predetermined delta value, if the Transaction.RS is equal to 0. Further, a search in the local name resolution cache is performed to search the DBID for the path name, such as /path1/path2/, and Transaction.RS if the file path is /path1/path2/name. If /path1/path2 is not in the local name resolution cache, a check is made for the presence of the leading path portion of the path name (e.g., /path1 and so on) in the name resolution cache, which can be used to determine the DBID for at least a leading portion of the path name. Further yet, when the mapping between path and DBID is not in the local name resolution cache, a path resolution request is sent to the virtual node that manages the first portion of the path (e.g., the root virtual node or the virtual node managing a DBID determined for the path leading portion). The path resolving node returns the DBID for Transaction.RS, with the result being valid for RS plus a predetermined amount of time. When the owner virtual node of the DBID changes the mapping, the owner virtual node notifies all nodes that cached the latest value in their name resolution path and the cached value has not expired. Further yet, the command is sent to the determined storage node.

A command regarding a first file system object is received 1432 by the virtual node 1208B from the name resolution node 1208E, the command indicating a name associated with the first file system object and a directory block identifier.

An entry corresponding to the name and directory block identifier is identified in a directory block map associated with the virtual node according to the command. In some example embodiments, the mapping manager 1308 may maintain the directory block map 1310, which may be a table or have other form, that has entries (e.g., rows) corresponding to directory blocks. For example, directory block map 1310 may include rows configured similarly to the rows of master directory block table 700. A name entry and directory block identifier (e.g., the GUID determined by the name resolution node for the last path portion) in forwarded command 1432 may be used by mapping manager 1308 as a row key to directory block map 1310 to determine a row with an entity block identifier to which the command is directed.

The mapping manager 1308 may interact with this determined entity block entry in any manner, depending on the type of command. For example, for a get-attributes command, mapping manager 1308 may determine one or more attributes in the entry requested by the command. For a command—such as one of set properties, create file, delete file, create directory, and delete directory—mapping manager 1308 may create a new entry in directory block map 1310 for a new version of the entity block, with attributes copied from the prior entry for the entity block identifier, but with a new commit time, and some attributes potentially modified (e.g., modifying any attributes specified in a set-properties command, setting the delete flag for a delete-file command, etc.).

It is to be noted that some commands, such as move file and move directory, may be performed as multiple commands. For example, the move-file command may be implemented by a create-file command and a delete-file command, where the create-file command creates a new entry for the entity block identifier in directory block map 1310 (of the same or a different virtual node, depending on the move destination) for the new directory block, and the delete-file command creates a new entity block identifier in directory block map 1310 (for the same virtual node) with the delete flag set. In such case, the query node may issue two or more commands to name resolution node(s) in sequence to have one or more storage nodes perform the commands to perform the overall command.

Further, the name resolution node and a path name indicated in the command are registered in a registry associated with the virtual node. As described above, in an embodiment, the mapping manager 1308 is configured to create an entry in name resolution node registry 1314 that associates the name resolution node (that forwarded the command to the storage node) with the path name in the forwarded command. The entry may further include a timestamp of the creation of the entry. This entry in name resolution node registry 1314 enables the name resolution node to be notified in the event that the path name is changed, and thus the name resolution node should invalidate any entries in its name resolution cache 1312C associated with the path name (the full path name or any portion thereof).

A query node of the virtual nodes is responded regarding the command. In an embodiment, after the storage node 1208B performs the command in forwarded command 1432, the storage node provides an indication 1430 to the query node 1208A of the command completion. By responding directly to the query node, rather than responding to the query node through the name resolution node, the number of communication links is reduced. With reference to the example of FIG. 14, the virtual node 1208B sends a command completion indication 1430 to the virtual node 1208A.

It is to be noted that the storage node may determine the query node to which command completion indication 1430 is to be sent in various ways. In one embodiment, command forwarder 1304 inserts an identifier for the query node when forwarding the command to the name resolution node, and the name resolution node forwards the query node identifier to the storage node. In another embodiment, the command forwarder 1304 publishes an identifier for the query node in a data structure, such as a memory location, a file, a cache, etc., in association with the command. The data structure is accessible by the storage node to determine the query node associated with the command. In other embodiments, the storage node may determine the query node in other ways.

Path names can be changed due to operations—such as move directory, rename directory, etc.—that change any path portion of the path name. Such a path name change adversely impacts entries in name resolution caches for that path name, making them invalid. As such, the storage node monitors for commands containing operations that change path names, which may cause mapping manager 1308 to modify entries in its virtual node's directory block map 1310 regarding the path name, as well as notifying the name resolution nodes registered for that path name (in name resolution node registry 1314) of the change.

Accordingly, embodiments provide many advantages, including enabling file system operations to be performed on entity blocks by manipulating data in directory block maps rather than necessarily operating on the stored file system objects themselves. For example, as described above, a file system object in the hierarchical namespace may be identified at least by a path and a name. The path may be changed for the file system object in the hierarchical namespace. In embodiments, the path change causes a modification to an entry in at least one directory block map for an entity block identifier of an entity block corresponding to the file system object. The change in the directory block map(s) accounts for the path change, and therefore, the change does not cause a file or folder corresponding to the entity block to be moved in storage of the storage system. Changing an entry in a directory block map is a much less costly operation than actually moving files and/or folders in storage. This is particularly true when the entity block is a folder containing many files. If the folder is moved, this would lead to many move file operations for the contained files (with each move entailing a delete-file and a create-file operation). Embodiments avoid moving stored file system objects by instead making changes in data block maps.

Figure 15:
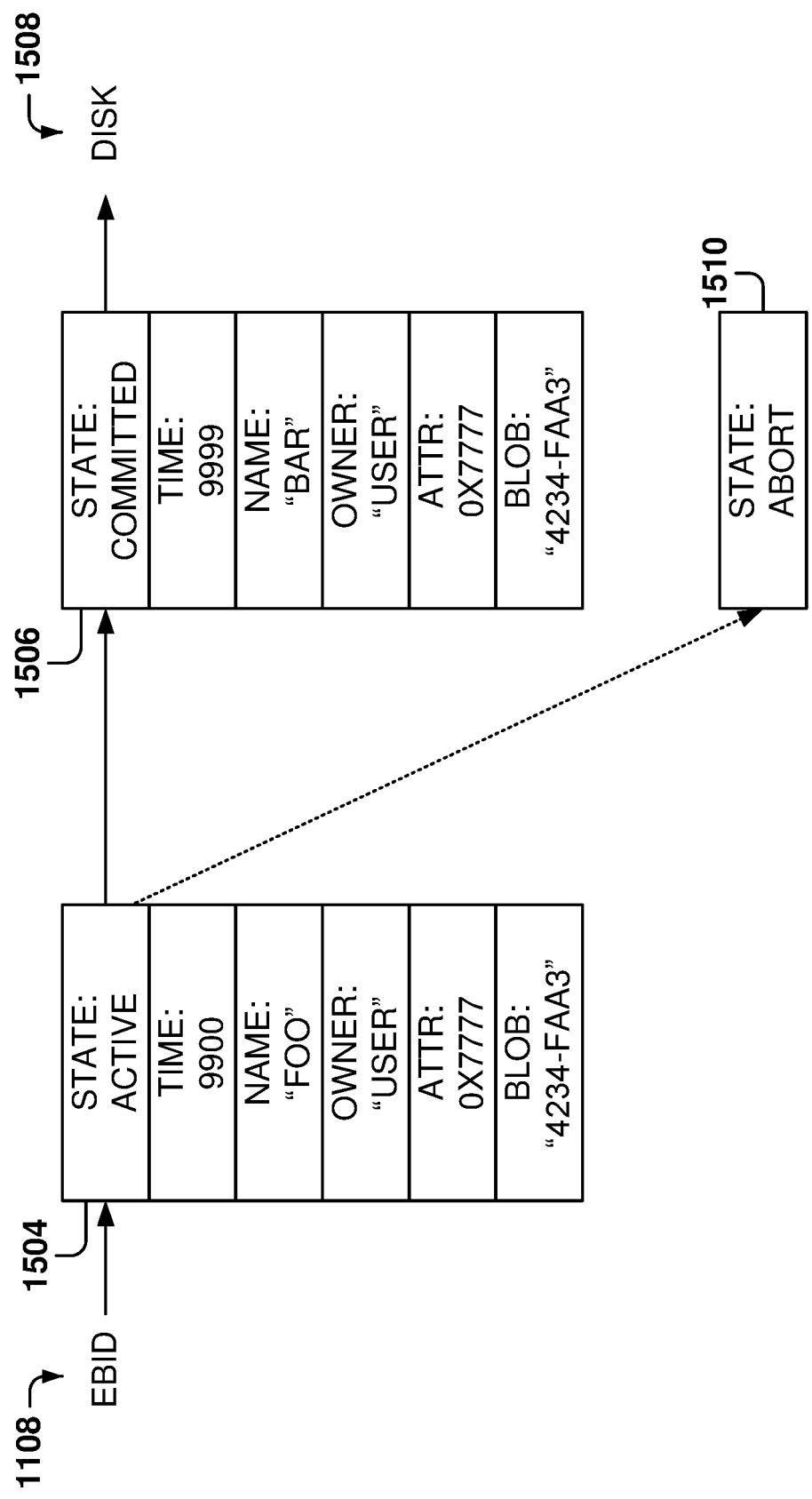
FIG. 15 illustrates the states of an entry in the memory table, according to some example embodiments

FIG. 15 illustrates the states of an entry in the memory table, according to some example embodiments. Each row in the memory table corresponds to an EBID and the row includes a list of transactions for the EBID 1108 with the respective states and CTs. Each transaction has a unique transaction identifier.

In some example embodiments, the state of the transaction may be one of "active," "committed," or "aborted." An active state means that the transaction is still in progress and has not finished. The committed state means that the transaction has been successful. The aborted state means that the transaction was not able to reach the committed state for some reason, such as a conflict with another transaction or a timeout. The client can set a maximum execution time for the transaction. If the transaction cannot complete within that time, the transaction is automatically aborted.

The client can choose number of retries before the transaction is aborted. The storage service will retry the transaction multiple times at different point of time until succeed or it exhausts the number of retries.

In some example embodiments, there is one memory table (served by the partition layer), distributed across the virtual nodes. Further, the memory table has its own partitioning and load balancing.

Figure 16:
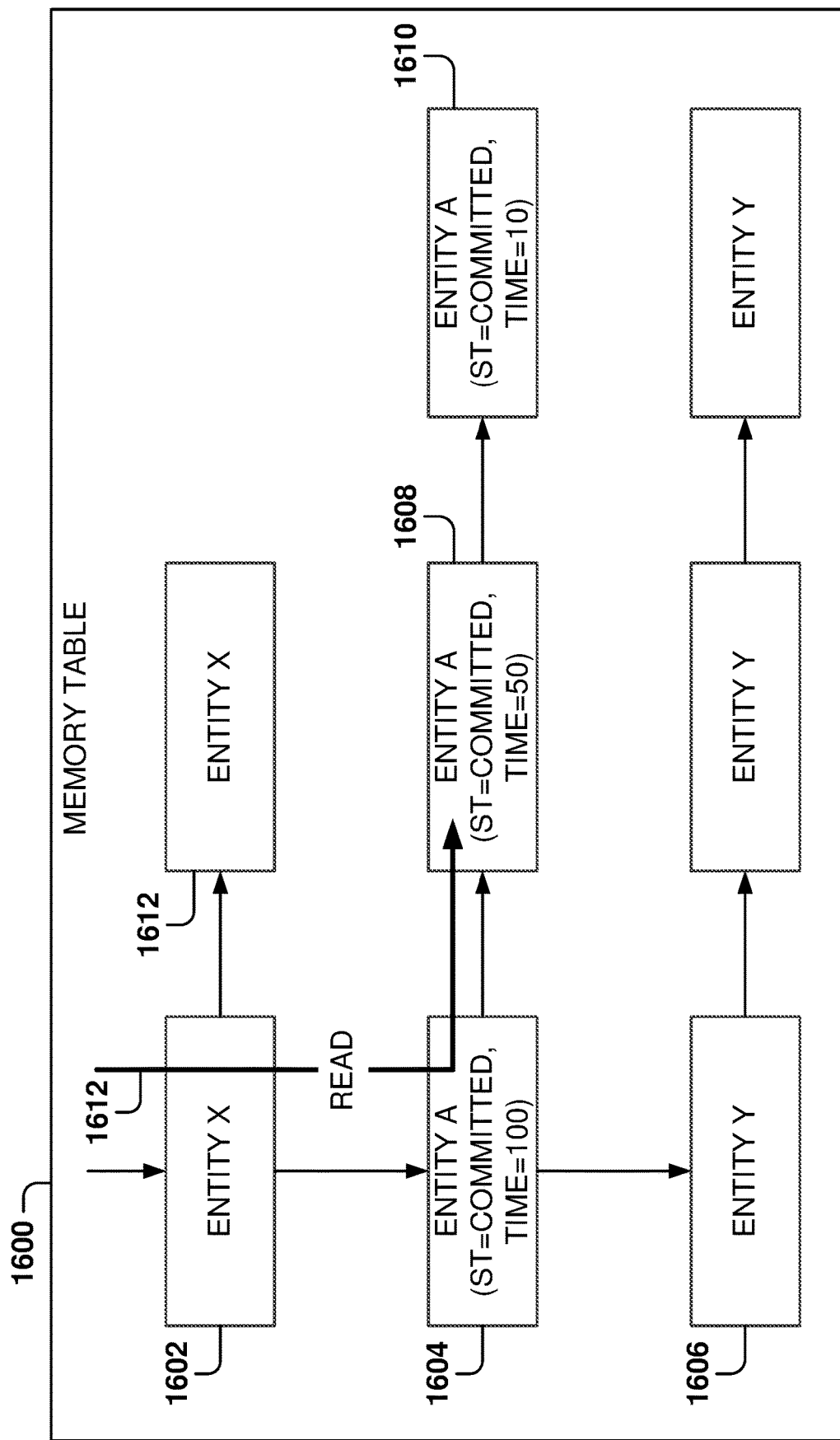
FIG. 16 illustrates a snapshot read operation, according to some example embodiments.

FIG. 16 illustrates a snapshot read operation, according to some example embodiments. A memory table 1600 holds information regarding the content of a directory, and the structure of the memory table 1600 allows for the efficient execution of read and write transactions. The memory table 1600 is logically organized as one row per entity, and each row contains a linked list of entries organized by the current timestamp CS, with newer entries at the head of the list.

In the example illustrated in FIG. 16, the memory table 1600 includes data for three entities X, A, and Y. For entity X, there is a head entry 1602 and an older entry 1612. For entity A, there are three linked entries, starting with the newer entry 1604, followed by entry 1608, which is followed by entry 1610. The entry 1604 has a state of committed and a timestamp of 100. The entry 1608 has a state of committed and a timestamp of 50 and the entry 1610 has a state of committed and a timestamp of 10. Entity Y has a head entry 1606 followed by two other entries.

To perform a snapshot read operation 1612 for a given time, the memory table is searched to identify the entry that was committed (e.g., newest) for that given time. The search starts with the head entry and continues until an entry is found with a timestamp lower than the time in the snapshot read request.

In the example illustrated in FIG. 16, a snapshot read is requested for time 70. Since the head entry has a timestamp of 100, this means that the head entry is posterior to the requested time and the head entry is therefore invalid for the snapshot read. The next entry 1608 has a timestamp of 50, which is less than the requested timestamp of 70; therefore, the entry 1608 is selected as the entry having the right information to satisfy the read request for time 70.

In some example embodiments, older entries may be discarded from the tale of the list based on a maximum number of entries or a certain threshold of time.

It is noted that a transaction is atomic if the transaction either completes entirely or not at all. All the transactions in a partition are atomic whether transaction affects a single row or multiple rows. In some example embodiments, there are three possible outcomes from a transaction request: success, failure, or timeout. Success means that the transaction succeeded, failure means that the transaction failed, and timeout means that the transaction may be a failure.

Partitions are always consistent, and consistency ensures that any transaction the partition executes will take the partition from one consistent state to another consistent state. For example, after a write transaction completes, any subsequent read transactions will observe the completed write transaction.

Transactions in a partition are isolated because each transaction appears to complete independently of all other concurrent transactions. Isolation ensures that the concurrent execution of transactions results in a partition state that would be obtained if transactions were executed serially. Further, reads have a transaction timestamp and cannot see either updates committed after their timestamp or uncommitted updates. Writes can see their own updates and utilize locking to ensure only one write at a time is executed. In some example embodiments, special logic is applied to allow certain kinds of writes to proceed in parallel, with more advanced locking techniques. Multiple writes may be executed in parallel for multiple entities, but for a specific entity, one write at a time is performed.

Snapshot isolation allows read transactions to execute without waiting for write transactions. Every update introduces an updated version of the data, and every version has a defined begin timestamp and end timestamp (which may be infinity for the most recent entry).

Figure 17:
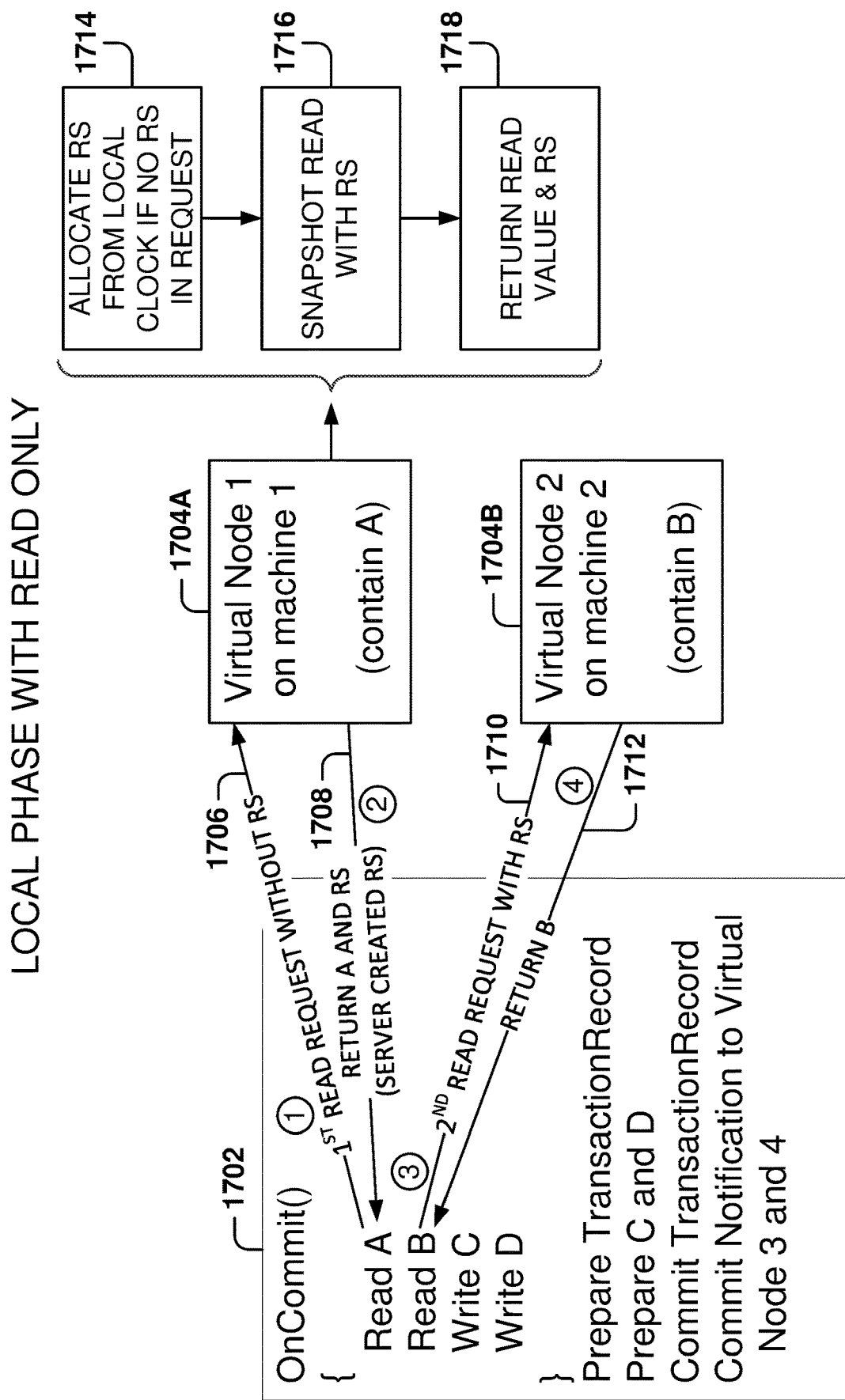
FIG. 17 illustrates a local phase operation with read only, according to some example embodiments.

FIG. 17 illustrates a local phase operation with read only, according to some example embodiments. A transaction coordinator is a virtual node that coordinates distributed transactions that require operations of multiple virtual nodes. In some example embodiments, the first node that receives the request for transaction is the transaction coordinator.

The transaction coordinator performs operations, such as starting a transaction by inserting a row in the memory table, executing commands one by one in the correct nodes, sending prepare messages to all the nodes, writing the outcome of the transaction to the memory table, and notifying all the nodes of the outcome of the transaction.

In an illustrative example, the transaction coordinator has received a command 1702 that includes a plurality of transactions. The command 1702 includes the following transactions:

```
OnCommit( )
{
    Read A
    Read B
    Write C
    Write D
}
Prepare TransactionRecord
Prepare C and D
Commit TransactionRecord
Commit Notification to Virtual Node 3 and 4
```

Thus, command 1702 includes two read transactions and two write transactions to be executed together. The first read transaction is sent 1706 to virtual node 1704A, which is the node containing A. The first read transaction does not include the read sequence RS (e.g., timestamp).

The virtual node 1704A performs the snapshot read, as described above with reference to FIG. 16, which includes operations 1714, 1716, and 1718. At operation 1714, the RS is assigned the value of the local clock because the first read request did not include the RS.

At operation 1716, the snapshot read operation is performed utilizing the RS as the time for the snapshot read. At operation 1718, the read value of A is returned with the assigned RS. Virtual node 1704A returns 1708 the value of A and the RS to the transaction coordinator.

The second read request is sent 1710 to virtual node 1704B, which is the node containing B. The second read request includes the timestamp RS and virtual node 1704B performs the snapshot read utilizing the given RS. The virtual node 1704B returns 1712 the value of B to the transaction coordinator.

In some example embodiments, the virtual nodes have loosely synchronized clocks, which means that the clocks in the virtual nodes may have a degree of variation. For example, the clocks in the virtual nodes may vary within a range of 1/10 of a second, or a second, or a few seconds. The coordination of operations between the virtual nodes does not require that the clocks in the virtual nodes are synchronized. It is noted that any type of method may be used to achieve the clock functionality. For example, the clock may be a logical clock, a physical clock, a strictly synchronized clock, a loosely synchronized clock, etc., and the embodiments presented herein may be implemented with any type of clock.

By enabling loosely synchronized clocks, the transaction coordinator does not have to communicate with all the virtual nodes involved to make sure that the clocks are in synch, and there is no need to have a clock coordinator supervising all the virtual nodes to make sure their clocks are synchronized.

In some example embodiments, a time synchronization beacon sends periodic time updates to the virtual nodes via UDP packages containing the current time. The periodic time updates may be sent periodically, where the period may be in the range from 50 ms to 10 seconds or more. This way, the clocks stay loosely synchronized, but without requiring that the clocks are exactly the same in all the virtual nodes.

In some example embodiments, when a first virtual node sends a message (e.g., a request) to a second virtual node, the message includes the time of the first virtual node. If the time in the second virtual node is behind the time received from the first virtual node, the second virtual node waits until the local time in the second virtual node reaches the received time from the first virtual node. After the wait, the request is processed by the second virtual node. On the other hand, if the time received from the first virtual node is behind the time at the second virtual node, the second virtual node does not wait and proceeds to process the request.

In some example embodiments, the transaction coordinator selects the commit time for the transaction by selecting the maximum time of all the nodes participating in the transaction.

In some example embodiments, a delta value may be used and the RS allocated in operation 1714 is set to the local time minus the delta value. The delta value may have a value of 0, and then the allocated RS is equal to the local clock time.

Figure 18:
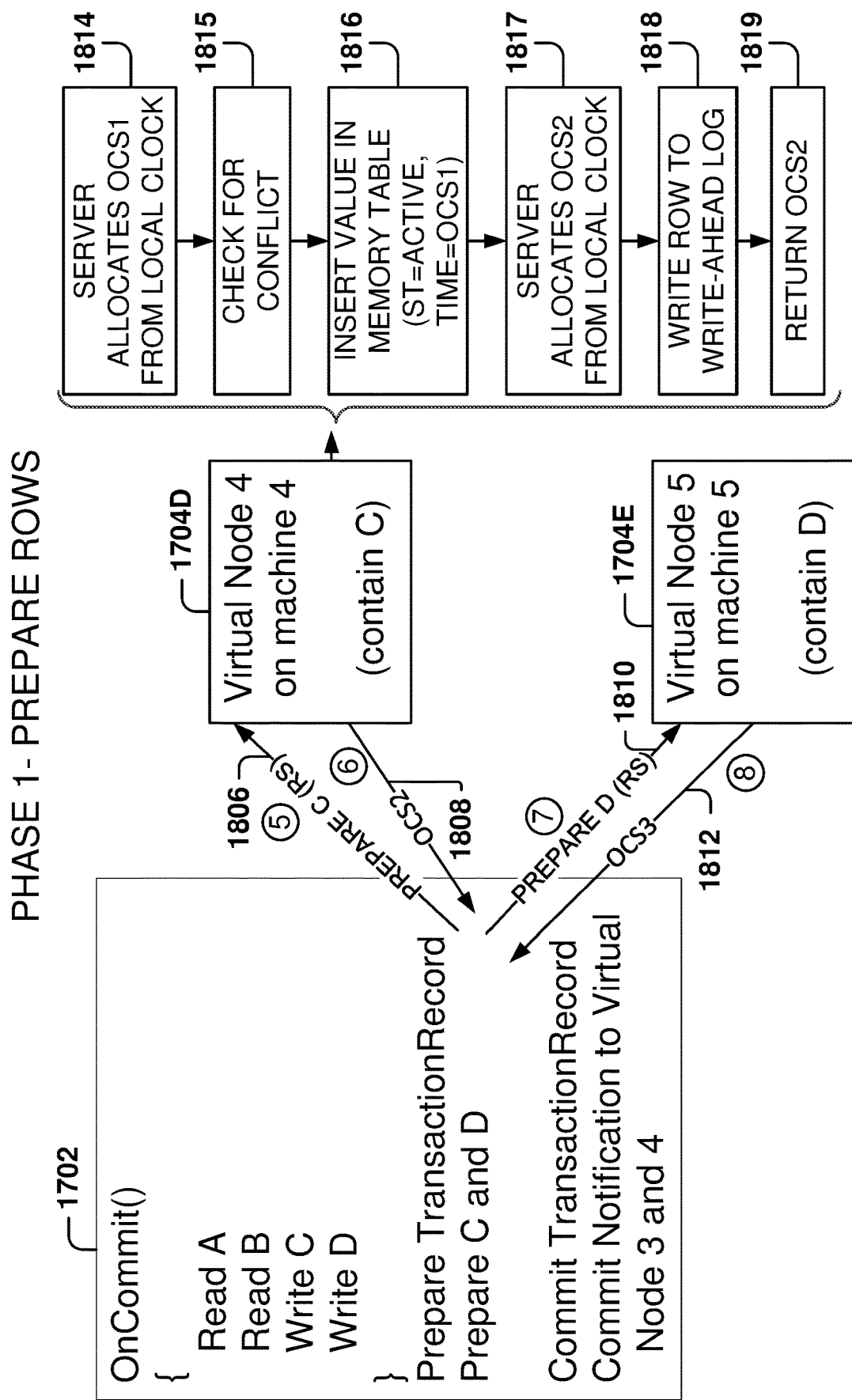
FIG. 18 illustrates the operation for preparing rows during phase one, according to some example embodiments.

FIG. 18 illustrates the operation for preparing rows during phase one, according to some example embodiments. To prepare the write operations, the transaction coordinator sends 1806 a prepare-C request, which includes the RS previously obtained, to virtual node 1704D. The virtual node 1704 then performs operations 1814 to 1819.

At operation 1814, the virtual node 1704D assigns the current value of the local clock to an optimistic concurrent timestamp 1 (OCS1), as long as the current value of the local clock is greater than the RS. If not, the virtual node 1704D waits until the local clock reaches RS and then assigns the current value of the local clock to OCS1.

At operation 1815, the virtual node 1704D checks for any conflicts with other ongoing transactions. Assuming that there are no conflicts, the method continues to operation 1816, otherwise the transaction is aborted. If the transaction is aborted, the transaction coordinator sends abort notifications to the virtual nodes involved in the process.

At operation 1816, a new entry is inserted at the head of the row for entity C in the memory table 1600. The new entry is inserted with the state of "active" and a timestamp of OCS1.

At operation 1817, the server assigns the value of the current clock to OCS2. Further, at operation 1818, the row for entity C from the memory table is written to the write-ahead log. At operation 1819, the virtual node 1704D returns 1808 a status that the new entry has been initialized and also returns the value of OCS2.

Similarly, sequentially or in parallel, the transaction coordinator sends 1810 the request to prepare entity D to virtual node 1704E, where the request includes the value of RS. The virtual node 1704E execute the same operations as the virtual node 1704D but for entity D. The virtual node 1704E then returns 1812 the status that the new entry for D has been initialized and an OCS3 value obtained from reading the local clock. In some example embodiments, the prepare-D operation is performed after the prepare-C operation, and OCS1 is sent to virtual node 1704E instead of RS.

Figure 19:
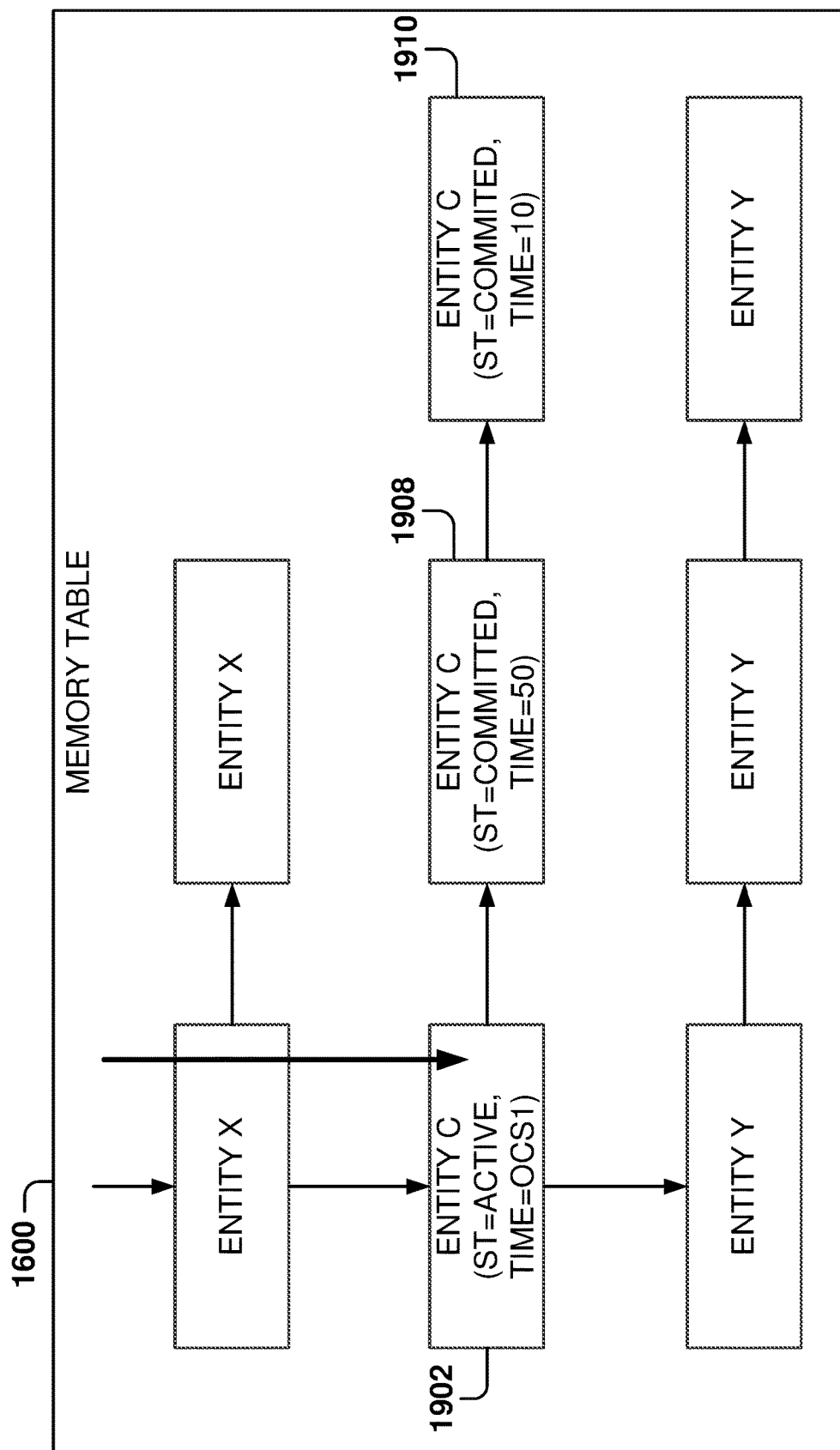
FIG. 19 illustrates a snapshot write operation, according to some example embodiments.

FIG. 19 illustrates the snapshot write operation 1816 from FIG. 8, according to some example embodiments. The new entry 1902 in the memory table is added. The virtual node traverses the different rows until the row for entity C is found, with the head at entry 1908. The new entry 1902 is added pointing to entry 1908 and the new entry 1902 becomes the head of the list for the row corresponding to entity C. As described above, the new entry 1902 is created with a state of "active" and the timestamp equal to OCS1.

Figure 20:
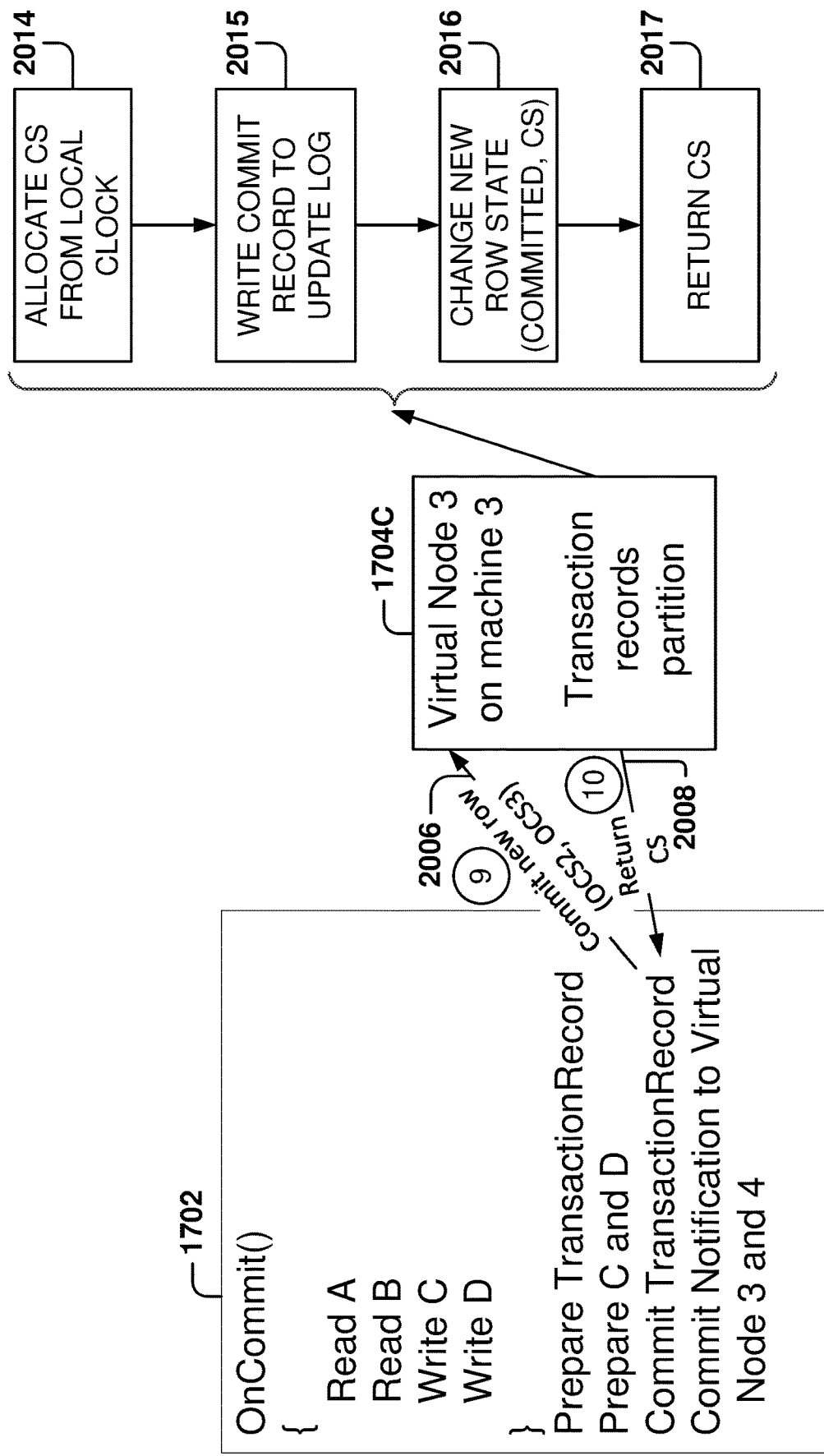
FIG. 20 illustrates phase two for a commit-transaction record, according to some example embodiments.

FIG. 20 illustrates phase two for a commit transaction record, according to some example embodiments. To perform the commit transaction record, the transaction coordinator sends 2006 a request to commit the new row to virtual node 1704C, which is the virtual node managing the transaction records partition. The request includes the values of OCS2 and OCS3.

The virtual node 1704C performs operations 2014-2017. At operation 2014, the virtual node 1704C allocates the CS, for transaction 1702, as the maximum value of OCS2, OCS3, and the value of the current clock at virtual node 1704C, which means selecting the CS as the latest of the three times. If the current value of the clock is greater than any of OCS2 and OCS3, then the virtual node 1704C waits until the value of the current clock is equal to the maximum of OCS2 and OCS3.

This means that the CS is selected as the maximum of the different times obtained at the virtual nodes involved in the transaction. By selecting the maximum of the different clock values, the virtual nodes are able to operate independently without having to rely on exact clock synchronization across all the virtual nodes. This allows the storage system to easily scale out because of the clock-independent operation of the virtual nodes. This reduces bottlenecks during execution that may slow down the system.

If the clocks happen to be very close to each other, then the execution will be fast. If there are any slight clock differences, the transaction can still succeed, but the lag may increase and the system may slow down slightly (still fast, but slightly slower than the ideal case of perfect clock synchronization). However, there will never be incorrect execution even though the clocks may be lacking perfect synchronism.

At operation 2015, the virtual node 1704C writes the commit record to the update log, and, at operation 2016, the role in the transaction records partition is updated to a state of committed and the timestamp of the calculated CS. At operation 2017, the virtual node 1704C returns 2008 the completion status with the allocated CS.

Figure 21:
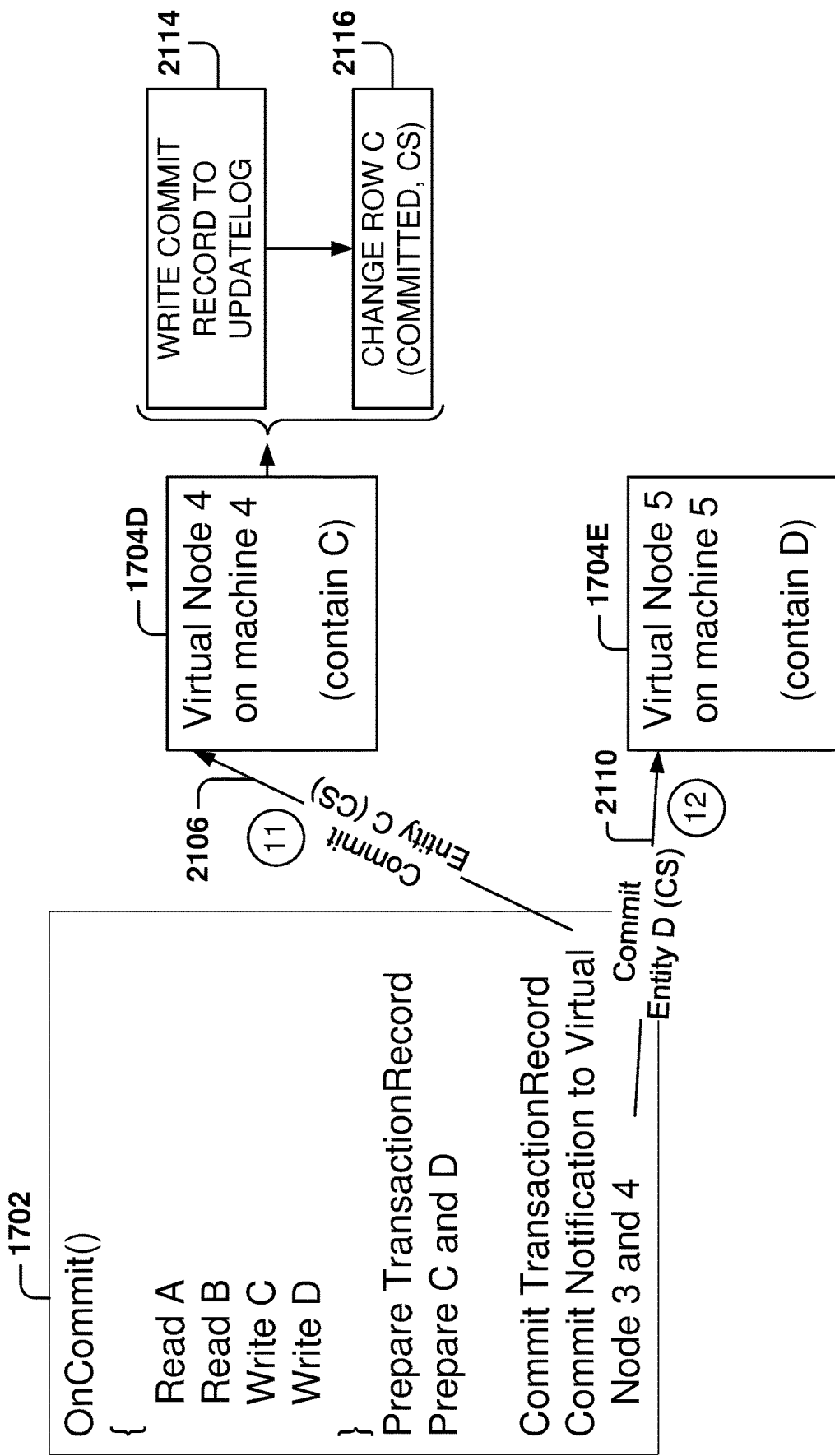
FIG. 21 illustrates the commit notification, according to some example embodiments.

FIG. 21 illustrates the commit notification, according to some example embodiments. After the transaction record has been committed, the virtual nodes 1704D and 1704E are notified of the commit and are requested to commit the respective writes with time CS.

Virtual node 1704D writes the commit record to the update the write-ahead log at operation 2114. At operation 2116, the virtual node 1704D changes the status of entry 1090, for entity C in the memory table, to "committed" and the timestamp to the calculated CS. Similarly, the virtual node 1704E changes the entry for entity D to "committed" with CS.

FIG. 22 shows the file system operations for the blob FS API, according to some example embodiments. The blob FS API leverages mechanisms already implemented for blob SS, such as transaction management, indexing, and durable storage, which provide strong consistency and can horizontally scale automatically without customer or operator interaction.

Further, blob FS API supports operations such as "copy file" and "concatenate" (e.g., "Concat") which are operations associated with metadata and indices, not requiring copying data as in traditional cloud object storage, enabled by the ability of blob SS that already supports an efficient copy-blob operation within the same storage account.

Table 2200 shows some of the file system operations of the blob FS API. The operations include creating a file system, deleting a file system, getting properties of the file system, setting the properties of the file system, and listing paths.

The format of the create file system operation is the command "Put" and the name of the file system. Additionally, the version of the API is provided. The format of the delete file system operation is the same, except that the command is "Delete."

Here is an example of the syntax for the operation to create a file system:

```
"put": {
    "operationId": "CreateFilesystem",
    "summary": "Create Filesystem",
    "description": "Create a filesystem rooted at the specified location. If the
filesystem already exists, the operation fails. This operation does not support
conditional HTTP requests.",
    "produces": ["application/json"],
    "tags": ["Filesystem Operations"],
    "responses": {
        "201": {"description": "Created", "headers": {
            "Date": {"description": "A UTC date/time value generated by the
service that indicates the time at which the response was initiated.", "type":
"string" },
            "ETag": {"description": "An HTTP entity tag associated with the
filesystem.", "type": "string"},
            "Last-Modified": { "description": "The data and time the filesystem was
last modified. Operations on files and directories do not affect the last modified
time.", "type": "string" },
            "x-ms-request-id": { "description": "A server-generated UUID recorded
in the analytics logs for troubleshooting and correlation.", "pattern": "^[{(]?[0-
9a-f]{8}[-]?([0-9a-f]{4}[-]?){3}[0-9a-f]{12}[)}]?$", "type": "string" },
            "x-ms-version": {"description": "The version of the REST protocol used
to process the request.", "type": "string"}
        } },
        "default": {"$ref": "#/responses/ErrorResponse" } },
    "parameters": [ { "name": "x-ms-properties", "description": "User-defined
properties to be stored with the filesystem, in the format of a comma-separated
list of name and value pairs \"n1=v1, n2=v2, ...\", where each value is base64
encoded.", "in": "header", "required": false, "type": "string" } ] }
```

FIG. 23 shows file and directory operations for the Blob FS API, according to some example embodiments. Table 2300 shows some of the file and directory operations, including: create file or directory, delete file or directory, rename file or directory, append data, flush data, read data, acquire lease for a path (including a duration), renew the lease, and release the lease.

Thus, blob FS API provides commands for adding, deleting, and renaming files or directories. Additionally, the properties of files and directories may be set and may be read.

For example, the delete-path command has the following request format:

```
DELETE {filesystem}/{path}?resource={file\directory}&
    recursive={true\false}&continuation={token}
    x-ms-lease-id: {id}
    If-Match: {eTag}
    If-None-Match: {eTag}
    If-Modified-Since: {date}
```

-continued

```
If-Unmodified-Since: {date}
AdditionalHeaders
```

Resource is a required value that indicates the type: file or directory. Recursive is an optional parameter, which is required and valid if the research is a directory. If recursive is true, all paths beneath the directory will be deleted. If recursive is false and the directory is empty, the directory will be deleted, otherwise an error is returned.

Continuation is an optional parameter. When deleting a directory, the number of paths that are deleted with each invocation is limited. If the number of paths to be deleted exceeds this limit, a continuation token is returned in the response header x-ms-continuation. When a continuation token is returned in the response, the continuation token must be specified in a subsequent invocation of the delete operation to continue deleting the directory. It is noted that for rename- and delete-directory operations, the Continuation parameter is returned in the response for FN; FN may need to continue, based on how many files are in the directory. For HN, it is always a single, atomic operation and there will not be a continuation parameter.

The format for the response to the delete-path command is:

```
HTTP/1.1 200 OK
Content-Length: 0
x-ms-continuation: token
AdditionalHeaders
\r\n\r\n
```

The rename-path command is similar to the delete-path command in its implementation, e.g., the rename-path command deletes directories when they are empty. The rename-path command overwrites the destination if it exists, but will fail if the resource type (file or directory) of an existing blob does not match the source blob. Further, the rename-path command also supports conditional and lease constraints on the source.

The rename-path command has the following request format:

```
PUT {filesystem}/{path}? resource={file\directory}&
    continuation={token}
    x-ms-lease-id: {id}
    If-Match: {eTag}
    If-None-Match: {eTag}
    If-Modified-Since: {date}
    If-Unmodified-Since: {date}
    x-ms-rename-source: {sourceUri}
    x-ms-source-lease-id: {id}
    x-ms-source-lease-action: {acquire}
    x-ms-source-if-match: {eTag}
    x-ms-source-if-none-match: {eTag}
    x-ms-source-if-modified-since: {date}
    x-ms-source-if-unmodified-since: {date}
    AdditionalHeaders
```

Here, Resource is a required value that can be file or directory to indicate the resource type. Continuation is an optional parameter. When renaming a directory, the number of paths that are renamed with each invocation is limited. If the number of paths to be renamed exceeds this limit, a continuation token is returned in the response header x-ms-continuation. When a continuation token is returned in the response, the continuation token must be specified in a subsequent invocation of the rename operation to continue renaming the directory.

The format for the response to the rename-path command is:

```
HTTP/1.1 201 Created
Content-Length: 0
x-ms-continuation: token
AdditionalHeaders
\r\n\r\n
```

The list-paths command uses a continuation when the list-paths command is unable to complete in a single invocation. The list-paths command has the following request format:

```
GET /{filesystem}?resource=filesystem&recursive={true\false}&
    directory={path}&continuation={token}
Headers
```

Here, Resource is a required parameter indicating the file system. Recursive is a required parameter and if the value is "true" then all paths are listed; if the value is "false" only the paths at the root of the filesystem are listed. If a directory is specified, the return list includes only the paths that are within the directory and the directory itself. Directory is an optional parameter to filter the results of the paths within the specified directory. If the directory does not exist, an error occurs.

Further, continuation is an optional parameter. If the number of paths to be returned exceeds a limit, a continuation token is returned in the response header x-ms-continuation. When a continuation token is returned in the response, the continuation token must be specified in a subsequent invocation of the list operation to continue listing the paths.

The format for the response to the list-paths command is:

```
HTTP/1.1 200 OK
x-ms-continuation: token
AdditionalHeaders
{
    "paths": [
    {
        "name": "string",
        "isDirectory": true,
        "lastModified": "string",
        "eTag": "string",
        "contentLength": 0,
        "contentType": "string",
        "leaseStatus": "string",
        "leaseDuration": "string",
        "serverEncrypted": true
    } ] }
```

It is noted that the API details provided herein are examples, and the APIs may include additional commands and parameters. Further, the APIs are versioned and behavior changes are done with a new API version so that the new versions are backwards compatible. This allows the storage system to be both compatible and extensible.

FIG. 24 shows sample blob-storage commands, according to some example embodiments. The sample command 2402 is as follows:

```
Create Account janeaccount
Create Container janeaccount;mycontainer
PUT
http://janeaccount.blob.core.windows.net/mycontainer/files/myblob.txt
Partition Key = janeaccount;mycontainer;files/myblob.txt
Put Block (10MB, B1) http://janeaccount.blob.core.windows.net/
    mycontainer/files/myblob.txt
Put Block (10MB, B2) http://janeaccount.blob.core.windows.net/
    mycontainer/files/myblob.txt
Put Block List (B1, B2) http://janeaccount.blob.core.windows.net/
    mycontainer/files/myblob.txt
Get Blob (2MB-4MB) http://janeaccount.blob.core.windows.net/
    mycontainer/files/myblob.txt
List Blobs delimeter "/", prefix "files/"
```

The first two commands create the account janeaccount and the container mycontainer within janeaccount. The PUT operation indicates the URI for the blob files/myblob.txt, where the URI is:

http://janeaccount.blob.core.windows.net/mycontainer/files/myblob.txt

Further, the partition key—a composite of the account name, the container name, and the blob name—is used to access the blob and uniquely identifies the blob. The partition key is janeaccount;mycontainer;files/myblob.txt in this example. The partition key is part of the illustrated commands, and has been omitted for simplicity of description.

It is noticed that, for FN, the name of the blob includes a "/" character, but this character does not mean that there is a directory structure in blob storage. The user is using the delimiter as an indication to simulate directories. Therefore, the user may request a list of blobs starting with files/ and the system will return the blobs based on the names of the blobs, not based on a search through a given directory.

The list blobs operation returns the blobs having a name starting with files/. As mentioned above, this may be a simplistic way of simulating directories, but directory features are not implemented in blob SS. For example, a user creates a million image files and simulates a directory by having the million image files having the same beginning of the name ("e.g., securityvideo/"). If the user wishes to rename the simulated directory with FN, the system has to rename one million blobs.

FIG. 25 shows sample blob FS commands, according to some example embodiments. The sample commands include the following:

```
Create Account janeaccount
Create File System janeaccount;myfs
Create Directory janeaccount;myfs;files
Create File http://janeaccount.dfs.core.windows.net/myfs/files/myblob.txt
Append File (10MB)
    http://janeaccount.dfs.core.windows.net/myfs/files/myblob.txt
Append File (10MB)
    http://janeaccount.dfs.core.windows.net/myfs/files/myblob.txt
Flush File (20MB)
    http://janeaccount.dfs.core.windows.net/myfs/files/myblob.txt
```

The blob FS commands include the creation of the account janeaccount and the filesystem janeaccount;myfs. Further, the blob FS commands include the creation of the directory janeaccount;myfs;files and the creation of the file myblob.txt inside the aforementioned directory, account, and file system. The URI for the file is:

http://janeaccount.dfs.core.windows.net/myfs/files/myblob.txt.

The blob FS API provides the command to create a directory, unlike the blob SS API, where the create directory command is not available. In some example embodiments, the DNS domain is different for blob FS than from blob SS as the two interfaces utilize a different access point.

To add data to the file, two append commands are used to append the data. Further, the flush command is implemented to flush the data to disk. It is noted that append is the actual data I/O, and flush is an index update to make the append operation readable by a read-file operation.

Figure 26:
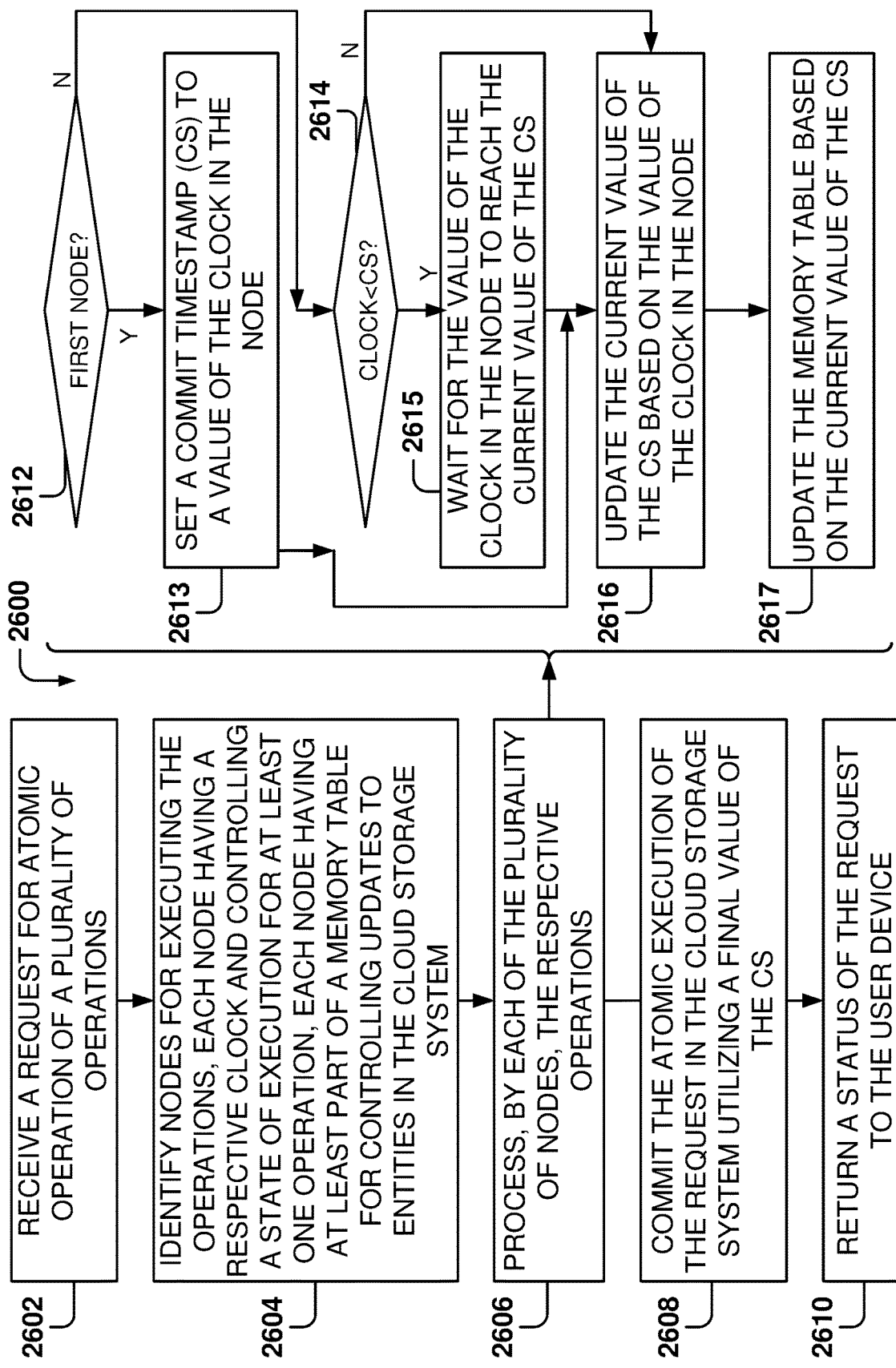
FIG. 26 is flowchart of a method for executing distributed transactions in a cloud storage system with a hierarchical namespace, according to some example embodiments.

FIG. 26 is flowchart of a method 2600 for executing distributed transactions in a cloud storage system with a hierarchical namespace, according to some example embodiments. While the various operations in this flowchart are presented and described sequentially, one of ordinary skill will appreciate that some or all of the operations may be executed in a different order, be combined or omitted, or be executed in parallel.

Operation 2602 is for receiving, from a user device, a request comprising a plurality of operations to be executed by a cloud storage system, the request being for atomic execution of the plurality of operations.

From operation 2602, the method flows to operation 2604 for identifying a plurality of nodes for executing the plurality of operations. Each node has a respective clock and controls a state of execution for at least one operation. Further, each node has at least part of a memory table for controlling updates to entities in the cloud storage system. An entity is one of a file or a directory.

From operation 2604, the method flows to operation 2606 for processing, by each of the plurality of nodes, the respective operations. Processing one operation includes performing method operations 2612-2617.

At operation 2612, a check is made to determine if the node is a first node in the processing. If the node is the first node, the method flows to operation 2613, and if the node is not the first node, the method flows to operation 2614. It is noted that if the node that received the request [0251] is not the first node in the processing, then the first nodes acts as a coordinator to coordinate the execution of the individual operations.

At operation 2613, a commit timestamp (CS) is set to a value of the clock in the node. For a read transaction, the transaction manager sets the read timestamp, if the user has not provided the read timestamp. For write transactions, the transaction manager chooses the maximum of the commit CS returned from plurality of nodes. At operation 2614, a check is made to determine if the value of the clock in the node is less than a current value of the CS, and if the check is positive, the method flows to operation 2615 and to operation 2616 otherwise.

Operation 2615 is for waiting for the value of the clock in the node to reach the current value of the CS. Further, operation 2616 is for updating the current value of the CS based on the value of the clock in the node.

From operation 2616, the method flows to operation 2617 for updating the memory table based on the current value of the CS.

At operation 2608, the atomic execution of the request is committed in the cloud storage system utilizing a final value of the CS. From operation 2608, the method flows to operation 2610, where the status of the request is returned to the user device.

In one example, the memory table includes a linked list of entries for each entity, each entry corresponding to write operations and having a state and the CS.

In one example, the state is one of active, committed, or aborted, where active indicates that a transaction is still in progress and committed indicates that the transaction was successful.

In one example, each clock is one of a loosely-synchronized clock, a strictly-synchronized clock, a logical clock, or a physical clock.

In one example, a first operation from the plurality of operations is a read operation, wherein processing the read operation further includes performing a snapshot read based on the current value of the CS, and a second operation from the plurality of operations is a write operation, wherein processing the write operation further includes adding an entry in the memory table for an entity associated with the write operation, the entry including the current value of the CS.

In one example, committing the atomic execution of the request further comprises changing a state of entries, created in the memory table of the nodes during the processing, from active to committed with the final value of the CS.

In one example, the nodes are virtual nodes executing on a plurality of physical nodes in a storage layer of the cloud storage system.

In one example, atomic execution includes executing all the plurality of operations such that all the operations are successful or none of the operations are executed and the atomic execution is aborted.

In one example, the cloud storage system includes a hierarchical namespace service that maps entities to blobs in a storage layer.

In one example, committing the atomic execution of the request further comprises notifying the plurality of nodes of the final value of the CS.

Figure 27:
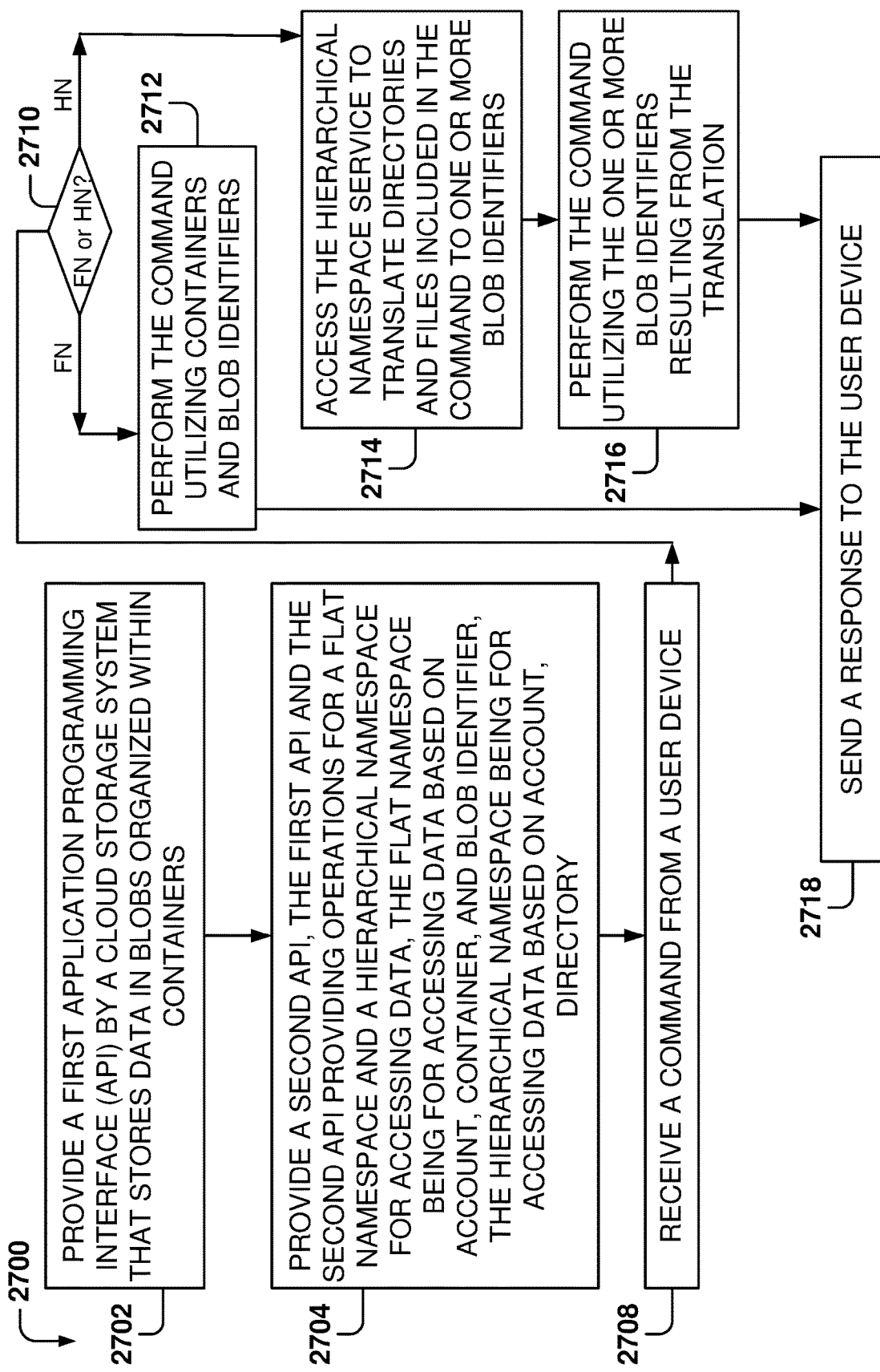
FIG. 27 is flowchart of a method for providing multi-protocol access to a cloud storage system, according to some example embodiments.

FIG. 27 is flowchart of a method 2700 for providing multi-protocol access to a cloud storage system, according to some example embodiments. While the various operations in this flowchart are presented and described sequentially, one of ordinary skill will appreciate that some or all of the operations may be executed in a different order, be combined or omitted, or be executed in parallel.

Operation 2702 is for providing a first API by a cloud storage system that stores data in blobs organized within containers.

From operation 2702, the method flows to operation 2704 for providing, by the cloud storage system, a second API, the first API and the second API providing operations for a flat namespace and a hierarchical namespace for accessing data. The flat namespace is for accessing data based on account, container, and blob identifier, and the hierarchical namespace is for accessing data based on account, directory, and file. A directory is configured to include files and other directories, where the first API utilizes the flat namespace by default and the second API utilizes the hierarchical namespace by default.

From operation 2704, the method flows to operation 2708, where a command from a user device is received by the cloud storage system.

At operation 2710, a check is made to determine if the command is received via the flat namespace or the hierarchical namespace. If the command is received via for the flat namespace, the method flows to operation 2712, and if the command is received via the hierarchical namespace, the method flows to operation 2714.

At operation 2716, the command is performed utilizing containers and blob identifiers included in the command. Further, at operation 2714, the hierarchical namespace service is accessed to translate directories and files included in the command to one or more blob identifiers.

From operation 2714, the method flows to operation 2716 for performing the command utilizing the one or more blob identifiers resulting from the translation. At operation 2718, a response is sent to the user device after executing the command.

In one example, the hierarchical namespace service assigns a unique identifier to each file and each directory, the unique identifier being different from a name of the file or directory.

In one example, the hierarchical namespace service includes a master directory block for identifying files or directories contained within each directory.

In one example, the second API includes commands including: create file system, delete file system, list paths of the file system, create directory, rename directory, delete directory, append file, flush file, and read file.

In one example, renaming a directory does not require renaming any blobs.

In one example, data is accessed via the first API with an address comprising account name of a user, container identifier, and blob identifier.

In one example, data is accessed via the second API with an address comprising account name of a user, file system identifier, directory identifier, and file identifier.

In one example, a file is stored in a blob.

In one example, the hierarchical namespace service assigns an empty blob to hold information of a directory.

In one example, the cloud storage system supports at least three blob types: block blobs, append blobs, and page blobs.

Figure 28:
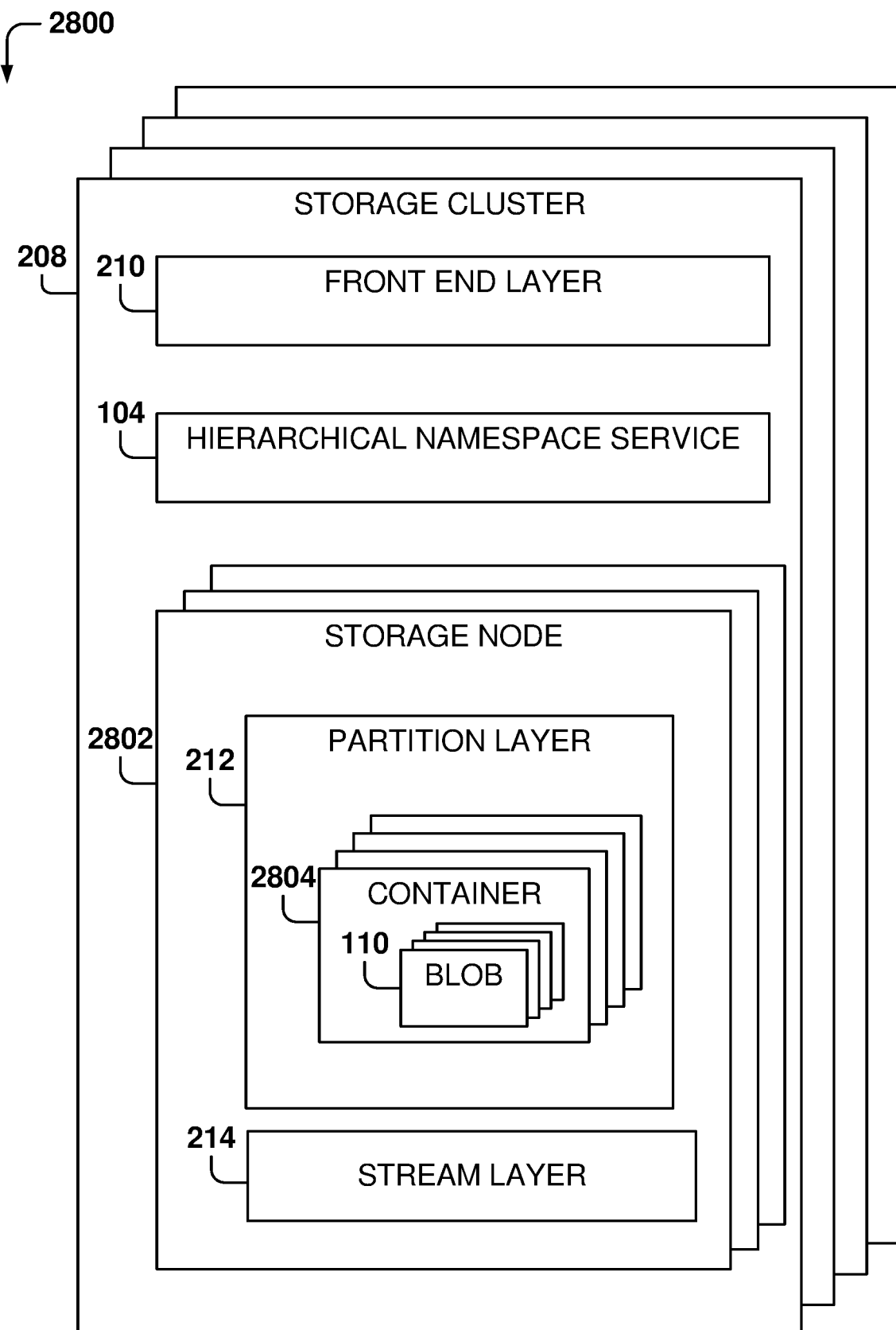
FIG. 28 is a system for providing file system functions on a cloud storage system based on blob storage, according to some example embodiments.

FIG. 28 is a system 2800 for providing file system functions on a cloud storage system based on blob storage, according to some example embodiments. The system 2800 includes a plurality of storage clusters 208 within a cloud storage system. Each storage cluster comprises: a plurality of storage nodes 2802, the hierarchical namespace service 104, and the front end layer 210. Each storage nodes 2802 includes a partition layer that stores data in blobs 110 within containers 2804, and a stream layer 214 for streaming blob data.

The hierarchical namespace service 104 is for implementing file system functions on the data stored in the blobs 110, the file system functions including directory functions and file functions, each directory being configured to include files and other directories as requested via the file system functions, each file being stored in one blob. The front end layer 210 is for processing user requests to access and manage data stored on the blobs 110, the front end layer 210 accessing the partition layer 212 to access the blobs 110 based on addresses of blobs 110, the front end layer 210 accessing the hierarchical namespace service 104 to identify the blobs 110.

In one example, the partition layer is configured to identify a partition key for flat namespace operations, the partition key including an account name, a container name, and a blob name.

In one example, the partition layer is configured to identify a partition key for hierarchical namespace operations, the partition key including an account name, a file system name, a directory name, and a file name.

In one example, the hierarchical namespace service contains one or more physical having a plurality of virtual nodes for performing namespace mapping.

In one example, the hierarchical namespace service comprises a plurality of directory blocks, wherein a global unique identifier is assigned to a directory in response to directory creation, and wherein the global unique identifier is not changed in response to renaming the directory.

In one example, the hierarchical namespace service comprises an entity block for each entity in the file system, the entity being one of a directory or a file, wherein the entity block for an entity may have multiple simultaneous versions in the cloud storage system.

In one example, the hierarchical namespace service comprises a master directory table that identifies files and directories within each directory, wherein performing a move of a directory or a file does not require moving or copying blobs.

In one example, the hierarchical namespace service is configured for mapping file system paths in the hierarchical namespace to blob identifiers in a flat namespace.

In one example, the cloud storage further includes a location service for managing account namespace metadata across the plurality of storage clusters.

In one example, the hierarchical namespace service supports file system operations comprising: create file system, delete file system, list paths of the file system, create directory, rename directory, delete directory, append file, flush file, and read file.

Figure 29:
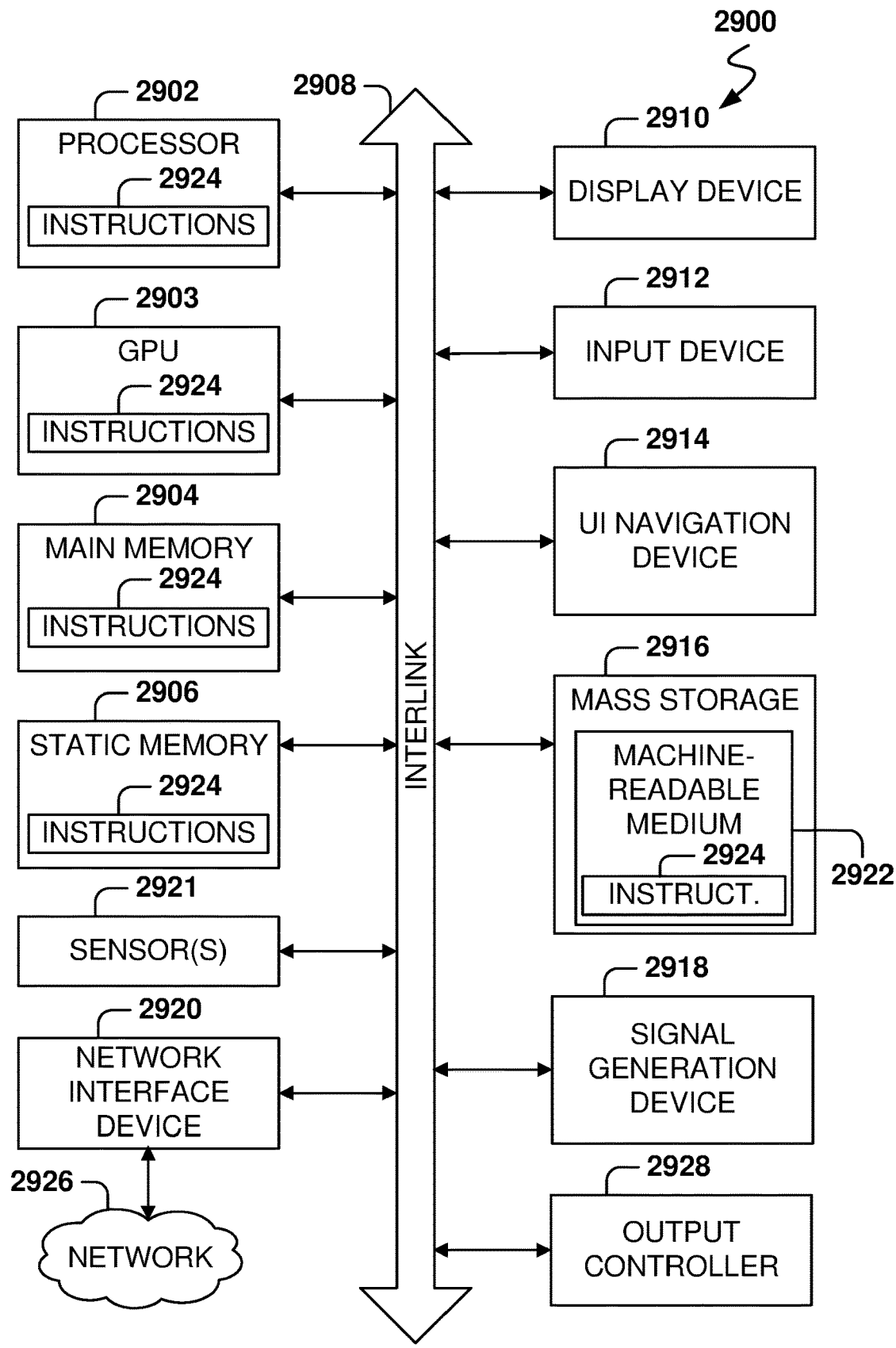
FIG. 29 is a block diagram illustrating an example of a machine upon or by which one or more example process embodiments described herein may be implemented or controlled.

FIG. 29 is a block diagram illustrating an example of a machine 2900 upon or by which one or more example process embodiments described herein may be implemented or controlled. In alternative embodiments, the machine 2900 may operate as a standalone device or may be connected (e.g., networked) to other machines. In a networked deployment, the machine 2900 may operate in the capacity of a server machine, a client machine, or both in server-client network environments. In an example, the machine 2900 may act as a peer machine in a peer-to-peer (P2P) (or other distributed) network environment. Further, while only a single machine 2900 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 2900 may include a hardware processor 2902 (e.g., a central processing unit (CPU, an FPGA), a hardware processor core, or any combination thereof), a graphics processing unit (GPU) 2903, a main memory 2904 (e.g., RAM, NVRAM), and a static memory 2906, some or all of which may communicate with each other via an interlink (e.g., bus) 2908. The machine 2900 may further include a display device 2910, an alphanumeric input device 2912 (e.g., a keyboard), and a user interface (UI) navigation device 2914 (e.g., a mouse). In an example, the display device 2910, alphanumeric input device 2912, and UI navigation device 2914 may be a touch screen display. The machine 2900 may additionally include a mass storage device (e.g., drive unit, SSD drive) 2916, a signal generation device 2918 (e.g., a speaker), a network interface device 2920, and one or more sensors 2921, such as a Global Positioning System (GPS) sensor, compass, accelerometer, or another sensor. The machine 2900 may include an output controller 2928, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The mass storage device 2916 may include a machine-readable medium 2922 on which is stored one or more sets of data structures or instructions 2924 (e.g., software) embodying or utilized by any one or more of the techniques or functions described herein. The instructions 2924 may also reside, completely or at least partially, within the main memory 2904, within the static memory 2906, within the hardware processor 2902, or within the GPU 2903 during execution thereof by the machine 2900. In an example, one or any combination of the hardware processor 2902, the GPU 2903, the main memory 2904, the static memory 2906, or the mass storage device 2916 may constitute machine-readable media.

While the machine-readable medium 2922 is illustrated as a single medium, the term "machine-readable medium" may include a single medium, or multiple media, (e.g., a centralized or distributed database, and/or associated caches and servers) configured to store the one or more instructions 2924.

The term "machine-readable medium" may include any medium that is capable of storing, encoding, or carrying instructions 2924 for execution by the machine 2900 and that cause the machine 2900 to perform any one or more of the techniques of the present disclosure, or that is capable of storing, encoding, or carrying data structures used by or associated with such instructions 2924. Non-limiting machine-readable medium examples may include solid-state memories, and optical and magnetic media. In an example, a massed machine-readable medium comprises a machine-readable medium 2922 with a plurality of particles having invariant (e.g., rest) mass. Accordingly, massed machine-readable media are not transitory propagating signals to the extent local law does not permit claiming signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2924 may further be transmitted or received over a communications network 2926 using a transmission medium via the network interface device 2920.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A cloud storage system comprising:
   a plurality of storage clusters, each storage cluster comprising:
      a plurality of storage nodes, each storage node comprising:
         one or more computer processors;
         a partition layer that stores data in blobs within containers; and
         a stream layer for streaming blob data;
      a hierarchical namespace service, executing on the one or more computer processors, for implementing file system functions on the data stored in the blobs, the file system functions including directory functions and file functions, each directory being configured to include files and other directories as requested via the file system functions, each file being stored in one blob, wherein the hierarchical namespace service comprises a master directory table that identifies files and directories within each directory, wherein performing a move of a directory or a file does not require moving or copying blobs; and
      a front end layer, executing on the one or more computer processors, for processing user requests to access and manage data stored on the blobs, the front end layer accessing the partition layer to access the blobs based on addresses of blobs, the front end layer accessing the hierarchical namespace service to identify the blobs.

2. The cloud storage system as recited in claim 1, wherein the partition layer is configured to identify a partition key for flat namespace operations, the partition key including an account name, a container name, and a blob name.

3. The cloud storage system as recited in claim 1, wherein the partition layer is configured to identify a partition key for hierarchical namespace operations, the partition key including an account name, a file system name, one or more directory names, and a file name.

4. The cloud storage system as recited in claim 1, wherein the hierarchical namespace service contains one or more physical nodes having a plurality of virtual nodes for performing namespace mapping.

5. The cloud storage system as recited in claim 1, wherein the hierarchical namespace service comprises a plurality of directory blocks, wherein a global unique identifier is assigned to a directory in response to directory creation, and wherein the global unique identifier is not changed in response to renaming the directory.

6. The cloud storage system as recited in claim 1, wherein the hierarchical namespace service comprises an entity block for each entity in the file system, the entity being one of a directory or a file, wherein the entity block for an entity may have multiple simultaneous versions in the cloud storage system.

7. The cloud storage system as recited in claim 1, wherein the hierarchical namespace service is configured for mapping file system paths in a hierarchical namespace to blob identifiers in a flat namespace.

8. The cloud storage system as recited in claim 1, further comprising:
   a location service for managing account namespace metadata across the plurality of storage clusters.

9. The cloud storage system as recited in claim 1, wherein the hierarchical namespace service supports file system operations comprising: create file system, delete file system, list paths of the file system, create directory, rename directory, delete directory, append file, flush file, and read file.

10. A method comprising:
    providing a plurality of storage clusters within a cloud storage system, each storage cluster comprising:
       a plurality of storage nodes, each storage node comprising:
          one or more computer processors;
          a partition layer that stores data in blobs within containers; and
          a stream layer for streaming blob data;
       a hierarchical namespace service, executing on the one or more computer processors, for implementing file system functions on the data stored in the blobs, the file system functions including directory functions and file functions, each directory being configured to include files and other directories as requested via the file system functions, each file being stored on one blob, wherein the hierarchical namespace service comprises a master directory table that identifies files and directories within each directory, wherein performing a move of a directory or a file does not require moving or copying blobs; and a front end layer, executing on the one or more computer processors, for processing user requests to access and manage data stored on the blobs, the front end layer accessing the partition layer to access the blobs based on addresses of blobs, the front end layer accessing the hierarchical namespace service to identify the blobs.

11. The method as recited in claim 10, wherein the partition layer is configured to identify a partition key for flat namespace operations, the partition key including an account name, a container name, and a blob name.

12. The method as recited in claim 10, wherein the partition layer is configured to identify a partition key for hierarchical namespace operations, the partition key including an account name, a file system name, one or more directory names, and a file name.

13. The method as recited in claim 10, wherein the hierarchical namespace service contains one or more physical nodes having a plurality of virtual nodes for performing namespace mapping.

14. The method as recited in claim 10, wherein the hierarchical namespace service comprises a plurality of directory blocks, wherein when a global unique identifier is assigned to a directory when the directory is created, wherein the global unique identifier is not changed when the directory is renamed.

15. A non-transitory machine-readable storage medium including instructions that, when executed by a machine, cause the machine to perform operations comprising:

providing a plurality of storage clusters within a cloud storage system, each storage cluster comprising:

a plurality of storage nodes, each storage node comprising:

a partition layer that stores data in blobs within containers; and a stream layer for streaming blob data;

a hierarchical namespace service for implementing file system functions on the data stored in the blobs, the file system functions including directory functions and file functions, each directory being configured to include files and other directories as requested via the file system functions, each file being stored in one blob, wherein the hierarchical namespace service comprises a master directory table that identifies files and directories within each directory, wherein performing a move of a directory or a file does not require moving or copying blobs; and a front end layer for processing user requests to access and manage data stored on the blobs, the front end layer accessing the partition layer to access the blobs based on addresses of blobs, the front end layer accessing the hierarchical namespace service to identify the blobs.

16. The non-transitory machine-readable storage medium as recited in claim 15, wherein the partition layer is configured to identify a partition key for flat namespace operations, the partition key including an account name, a container name, and a blob name.

17. The non-transitory machine-readable storage medium as recited in claim 15, wherein the partition layer is configured to identify a partition key for hierarchical namespace operations, the partition key including an account name, a file system name, one or more directory names, and a file name.

18. The non-transitory machine-readable storage medium as recited in claim 15, wherein the hierarchical namespace service contains one or more physical nodes having a plurality of virtual nodes for performing namespace mapping.

19. The non-transitory machine-readable storage medium as recited in claim 15, wherein the hierarchical namespace service comprises a plurality of directory blocks, wherein when a global unique identifier is assigned to a directory when the directory is created, wherein the global unique identifier is not changed when the directory is renamed.

\* \* \* \* \*